United States Patent
Vincent et al.

(10) Patent No.: US 6,940,497 B2
(45) Date of Patent: *Sep. 6, 2005

(54) PORTABLE ELECTRONIC READING APPARATUS

(75) Inventors: Kent D. Vincent, Cupertino, CA (US); R. Stanley Williams, Redwood City, CA (US); Xiao-An Zhang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 183 days.

This patent is subject to a terminal disclaimer.

(21) Appl. No.: 09/978,384

(22) Filed: Oct. 16, 2001

(65) Prior Publication Data

US 2003/0071800 A1 Apr. 17, 2003

(51) Int. Cl.⁷ ................................................. G09G 5/00
(52) U.S. Cl. ........................................ 345/204; 345/206
(58) Field of Search ............................... 345/204, 156, 345/107, 206, 901; 428/323, 99; 430/45; 347/112; 713/200

(56) References Cited

U.S. PATENT DOCUMENTS

| | | | |
|---|---|---|---|
| 5,604,027 A | | 2/1997 | Sheridon ....................... 428/32 |
| 5,746,817 A | * | 5/1998 | Katsen et al. ............. 106/31.65 |
| 5,781,330 A | | 7/1998 | Kolodner et al. |
| 5,866,284 A | * | 2/1999 | Vincent ........................ 430/37 |
| 5,937,158 A | * | 8/1999 | Uranaka ...................... 713/200 |
| 6,037,954 A | | 3/2000 | McMahon .................. 345/901 |
| 6,045,955 A | * | 4/2000 | Vincent ........................ 430/45 |
| 6,107,988 A | | 8/2000 | Phillipps ...................... 345/156 |
| 6,124,851 A | | 9/2000 | Jacobson ..................... 345/206 |
| 6,194,072 B1 | | 2/2001 | Hambitzer et al. |
| 6,407,763 B1 | * | 6/2002 | Yamaguchi et al. ......... 347/112 |
| 6,498,597 B1 | * | 12/2002 | Sawano ....................... 345/107 |
| 6,556,470 B1 | * | 4/2003 | Vincent et al. .............. 365/151 |
| 6,579,742 B2 | * | 6/2003 | Chen ............................ 438/99 |

FOREIGN PATENT DOCUMENTS

| | | | | |
|---|---|---|---|---|
| EP | 1000741 | | 5/2000 | |
| EP | 1116767 | | 7/2001 | |
| JP | 04178684 | * | 6/1992 | ................. 345/107 |
| JP | 132122 | * | 5/2000 | ................. 345/107 |
| WO | WO9820013 | | 5/1998 | |
| WO | WO9854690 | | 12/1998 | |
| WO | WO02088837 | | 11/2002 | |

OTHER PUBLICATIONS

Chen Gangjin et al: "Electrochromic mechanism study of corona poled electro–optic polymer films" Proc of the 6th Intl. Con. on Prop. A. APPL. of Dielectric Materials vol. 2, Jun. 21, 2000 pp. 741–744, XP010516192.

(Continued)

Primary Examiner—Vijay Shankar
Assistant Examiner—Prabodh M Dharia

(57) ABSTRACT

An electronic book, having a single screen, employs an electric field addressable, rewritable, colorant, preferably a bistable molecular colorant, for providing printed pages sequentially to a reader. The electronic book includes the rewritable screen coupled to an extraction-retraction device, an electrode array printer, a sheet position detector, and associated circuitry to download, store, sequence, and print images on the screen. Methods associated with document distribution are another aspect of the invention.

48 Claims, 6 Drawing Sheets

OTHER PUBLICATIONS

Tamulis A et al: "AB Initio Quantum Chemical Design of Supermolecule Logical Devices" Proceedings of the SPIE, SPIE, Bellingham, VA, US, vol. 4290, Jan. 24, 2001 pp. 82–93, XP008004659.

Sinha H K et al: "Ground– and Excited State Dipole Moments of some Nitroaromatics: Evidence for Extensive change transfer in Twisted Nitrobenzene System" Journal of Chemical Physics, New York, NY, US Nov. 15, 1990 vol. 93, No. 10 pp. 7085–7093 XP008006682.

Bermudez V et al: "Influencing intramolecular motion with an alternating gelectric field"Nature, MacMillan Journal LTD. Londan, GB vol. 406, No. 6796 Aug. 10, 2000 pp. 608–611.

Speiser S: "Utilization of Intramolecular Energy and Electron Transfer Processes in Bichromophoric Molecules for Electrooptics Applications" Proceedings of the SPIE, Bellingham, VA, US, vol. 3473, Jul. 20, 1998 pp. 132–142, XP008006678.

Greenberg: "Optically switchable thin films: a review" thin solid films, Elsevier–Sequoia S.A. Lausanne, CH, vol. 251, No. 2 pp.: 81–93 XP004012268.

Kolodner P et al: "Electric–Field Indued Schiff–Base Deprotonation in D85N Mutant Bacteriorhodopsin" Proceedins of the Ntional Academy of Science, USA Washington vol. 93 Oct. 1996.pp. 11618–11621 XP000980079.

Muraldharan S et al: "Confromational Effects on Charge–Transfer Properties in Selected 9,10–Disubstituted Anthracene Derivatives: Ground– and Excited–State Dipole Moments" Journal of Physical Chemistry, American Chemical Society, US Oct. 31, 1991 vol. 95, No. 22 pp. 8517–8520 XP008006699.

* cited by examiner

PORTABLE ELECTRONIC READING APPARATUS

CROSS-REFERENCE TO RELATED APPLICATIONS

None.

STATEMENT REGARDING FEDERALLY SPONSORED RESEARCH OR DEVELOPMENT

None.

REFERENCE TO AN APPENDIX

The present application includes a hard copy appendix comprising pertinent specification pages and drawings of co-inventors' U.S. patent application Ser. No. 09/844,862, by ZHANG et al. for MOLECULAR MECHANICAL DEVICES WITH A BAND GAP CHANGE ACTIVATED BY AN ELECTRIC FIELD FOR OPTICAL SWITCHING APPLICATION (Hewlett-Packard Company, assignee) as relates to subject matter claimed in accordance with the present invention.

BACKGROUND OF THE INVENTION

1. Field of the Invention

The present invention relates generally to electronic publishing and, more particularly, to portable electronic reading apparatus. More specifically, the present invention relates to an electronic book using bi-modal, bistable molecular imaging technology, sometimes referred to in the art as "nanotechnology."

2. Description of Related Art

Portable reading material today is made available through books, magazines, newspapers, and various other forms of hard copy using a colorant (e.g., ink or toner) on paper. Readable informational text and image content (hereinafter simply "content" or "document content") published in these forms is of a sufficiently high resolution and contrast to be read easily over prolonged periods of time without eye discomfort. Such commercial grade high resolution print is over 600 dots per inch. Portability allows individual user preference for comfortable reading in locations of choice. Moreover, body positions may be periodically varied to change reading distance and posture to maintain personal comfort. Generally, such hard copy print media requires high costs in printing, binding, warehousing, and distribution. Since these factors require a relatively lengthy time expenditure between content generation and availability to the reader, the content of the media is often not contemporaneous; even newsprint is in reality yesterday's or last week's news. The cost is normally amortized through a single reading, after which the book or document is physically stored or discarded. Moreover, hard copy is not an environmentally friendly technology, either as to raw materials and print media manufacturing or waste management.

Computers, on the other hand, provide virtually instantaneous distribution of content through electronic means, such as the Internet, at significantly reduced cost to the reader. (The term "Internet" is used herein as a generic term for a collection of distributed, interconnected networks (ARPANET, DARPANET, World Wide Web, or the like) that are linked together by a set of industry standard protocols (e.g., TCP/IP, HTTP, UDP, and the like) to form a generally global, distributed network. Private and proprietary intranets are also known and are amenable to conforming uses of the present invention.) Computer displays, however, provide far less comfortable reading at significantly lower resolution when compared to hard copy print media. Cathode ray tube displays have low portability and require substantially stationary body positioning for reading at fixed focal length, leading to comparatively rapid eye strain and posture discomfort. Portable computer liquid crystal displays (LCD) allow somewhat greater portability, but at the expense of display contrast, off-axis viewability, and higher cost. The at least one order of magnitude lower resolution of computer displays in comparison to commercial print media commonly prevents the reader from seeing a full page of the comparable hard copy document at one time. In part, the further cost of lower resolution of portable displays stems from the difficulty of matrix addressing at higher resolution. Normally, the reader must use button controls to scroll the displayed image down the document page to read its contents. When a long document is downloaded, as from the Internet, the reader will commonly print the contents to gain back the aforementioned hard copy print media benefits. Such printing, however, adds local printing cost to the process for documents that are still commonly read once and discarded. Current computer solutions are contrary to the needs of book, magazine and newspaper distribution.

There is a need for a paradigm shift in the concept of reading media and media distribution and for providing portable electronic apparatus.

One exemplary solution is the fixed screen electronic book such as shown in U.S. Pat. No. 6,037,954 (Mar. 14, 2000), by McMahon, for a PORTABLE HAND-HELD READING DEVICE. McMahon uses a convention LCD display. The described device is limited both in size, resolution, viewing angle limitations, battery life, and general versatility by inherent limitations of the fixed screen display.

Another exemplary solution is the PORTABLE ELECTRONIC APPARATUS proposed by Phillipps in U.S. Pat. No. 6,107,988 (Aug. 22, 2000) for a folded display, hinged to be opened and closed in the manner of a book. This solution requires two LCD displays In addition to the limitations as mentioned with respect to the McMahon patented device, the Phillipps apparatus would have a relatively heavy power demand to support the double LCD display requirements.

A third exemplary solution is proposed by Jacobson in U.S. Pat. No. 6,124,851 (Sep. 26, 2000) for an ELECTRONIC BOOK WITH MULTIPLE PAGE DISPLAYS. Jacobson has multiple page displays formed on flexible, thin substrates which use E-Ink Corporation's (assignee) microcapsule electronic ink (FIGS. 7A–7D therein) for typesetting each page, maintaining a "natural haptic and visual interface of . . . normal paper books."

Moreover, with the paradigm shift as described, accessibility to electronic document service providers and document retrieval requires end-user devices having greater and easier accessibility to the content. Therefore, there is a need for a direct interface between the portable electronic reading apparatus and the content provider.

There is a need for an electronic reading apparatus solution providing a high resolution, high contrast, compact, portable, electronic book, exceeding the convenience of commercial print media and having a content access capability providing substantially instantaneous download capability.

BRIEF SUMMARY OF THE INVENTION

In its basic aspect, the present invention provides an electronic book device comprising: a rewritable viewing screen; and an electrical printhead for writing picture elements of said viewing screen, wherein said viewing screen has a rewritable electronic colorant for printing document content therewith.

In another aspect, the present invention provides a rewritable digital book device comprising: a housing means for housing components of said device; means for downloading, storing, sequencing, and erasably printing document content; and viewing means for sequentially, erasably writing said content at a commercial grade high resolution hard copy pixel resolution.

In still another aspect, the present invention provides a method of providing readable pages comprising: downloading data representative of each of said readable pages into a memory; providing a viewing screen having an electric field addressable rewritable colorant thereon; and writing each of said pages sequentially to the viewing screen by passing the screen adjacently across a printhead having electrical fields associated with pixels of the screen such that said data is transferred from said memory to said screen.

Another aspect of the present invention is a method of doing business of distribution of a document comprising: transmitting electronic data representative of said document; and providing a customer with mechanisms associated with said transmitting for said customer to receive said data on a portable reading device having a single display screen including an electric field addressable rewritable colorant displaying said data in a form substantially identical to a hard copy form of said document.

The foregoing summary is not intended to be an inclusive list of all aspects, objects, advantages, and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Objects, features and advantages of the present invention will become apparent upon consideration of the following explanation and the accompanying drawings, in which like reference designations represent like features throughout the drawings.

BRIEF DESCRIPTION OF THE DRAWINGS

In accordance with 37 C.F.R. 1.84(u), in order to prevent confusion with drawings of the Appendix hereto, the drawings of this application use double capital letter suffixes.

Figure 1A:
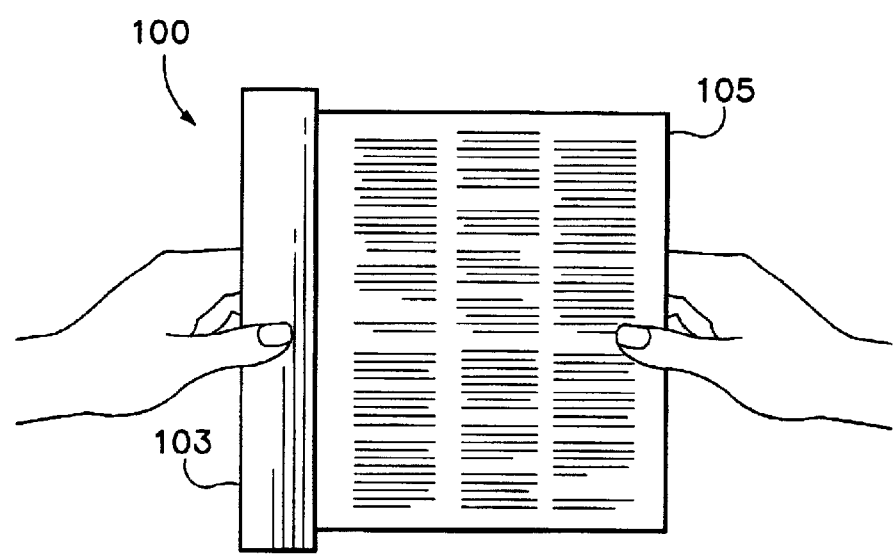
FIG. 1AA is a schematic illustration of the present invention.

The drawings referred to in this specification should be understood as not being drawn to scale except if specifically annotated.

DETAILED DESCRIPTION OF THE INVENTION

Reference is made now in detail to a specific embodiment of the present invention, which illustrates the best mode presently contemplated by the inventors for practicing the invention. Alternative embodiments are also briefly described as applicable.

Definitions

The following terms and ideas are applicable to both the present discussion and the Appendix hereto.

The term "self-assembled" as used herein refers to a system that naturally adopts some geometric pattern because of the identity of the components of the system; the system achieves at least a local minimum in its energy by adopting this configuration.

The term "singly configurable" means that a switch can change its state only once via an irreversible process such as an oxidation or reduction reaction; such a switch can be the basis of a programmable read-only memory (PROM), for example.

The term "reconfigurable" means that a switch can change its state multiple times via a reversible process such as an oxidation or reduction; in other words, the switch can be opened and closed multiple times, such as the memory bits in a random access memory (RAM) or a color pixel in a display.

The term "bistable" as applied to a molecule means a molecule having two relatively low energy states (local minima) separated by an energy (or activation) barrier. The molecule may be either irreversibly switched from one state to the other (singly configurable) or reversibly switched from one state to the other (reconfigurable). The term "multi-stable" refers to a molecule with more than two such low energy states, or local minima.

The term "bi-modal" for colorant molecules in accordance with the present invention may be designed to include the case of no or low activation barrier for fast but volatile switching. In this latter situation, bistability is not required, and the molecule is switched into one state by the electric field and relaxes back into its original state upon removal of the field; such molecules are referred to as "bi-modal". In effect, these forms of the bi-modal colorant molecules are "self-erasing". In contrast, in bistable colorant molecules the colorant molecule remains latched in its state upon removal of the field (non-volatile switch), and the presence of the activation barrier in that case requires application of an opposite field to switch the molecule back to its previous state. Also, "molecular colorant" as used hereinafter as one term to describe aspects of the present invention is to be distinguished from other chemical formulations, such as dyes, which act on a molecular level; in other words, "molecular colorant" used hereinafter signifies that the colorant molecules as described in the Appendix and their equivalents are employed in accordance with the present invention.

Micron-scale dimensions refers to dimensions that range from 1 micrometer to a few micrometers in size.

Sub-micron scale dimensions refers to dimensions that range from 1 micrometer down to 0.05 micrometers.

Nanometer scale dimensions refers to dimensions that range from 0.1 nanometers to 50 nanometers (0.05 micrometers).

Micron-scale and submicron-scale wires refers to rod or ribbon-shaped conductors or semiconductors with widths or diameters having the dimensions of 0.05 to 10 micrometers, heights that can range from a few tens of nanometers to a micrometer, and lengths of several micrometers and longer.

"HOMO" is the common chemical acronym for "highest occupied molecular orbital", while "LUMO" is the common chemical acronym for "lowest unoccupied molecular orbital". HOMOs and LUMOs are responsible for electronic conduction in molecules and the energy difference between the HOMO and LUMO and other energetically nearby molecular orbitals is responsible for the color of the molecule.

An "optical switch," in the context of the present invention, involves changes in the electro-magnetic properties of the molecules, both within and outside that detectable by the human eye, e.g., ranging from the far infra-red (IR) to deep ultraviolet (UV). Optical switching includes changes in properties such as absorption, reflection, refraction, diffraction, and diffuse scattering of electro-magnetic radiation.

The term "transparency" is defined within the visible spectrum to mean that optically, light passing through the colorant is not impeded or altered except in the region in which the colorant spectrally absorbs. For example, if the molecular colorant does not absorb in the visible spectrum, then the colorant will appear to have water clear transparency.

The term "omni-ambient illumination viewability" is defined herein as the viewability under any ambient illumination condition to which the eye is responsive.

As a general proposition, "media" in the context of the present invention includes any surface, whether portable or fixed, that contains or is layered with a molecular colorant or a coating containing molecular colorant in accordance with the present invention wherein "bistable" molecules are employed; for example, both a flexible sheet exhibiting all the characteristics of a piece of paper and a writable surface of an appliance (be it a refrigerator door or a computing appliance using the molecular colorant). "Display" (or "screen") in the context of the present invention includes any apparatus that employs "bi-modal" molecules, but not necessarily bistable molecules. Because of the blurred line regarding where media type devices ends and display mechanisms begin, no limitation on the scope of the invention is intended nor should be implied from a designation of any particular embodiment as a "media" or as a "display."

As will become apparent from reading the Detailed Description and Appendix, "molecule" can be interpreted in accordance with the present invention to mean a solitary molecular device, e.g., an optical switch, or, depending on the context, may be a vast array of molecular-level devices, e.g., an array of individually addressable, pixel-sized, optical switches, which are in fact linked covalently as a single molecule in a self-assembling implementation. Thus, it can be recognized that some molecular systems comprise a super-molecule where selective domain changes of individual molecular devices forming the system are available. The term "molecular system" as used herein refers to both solitary molecular devices used systematically, such as in a regular array pixel pattern, and molecularly linked individual devices. No limitation on the scope of the invention is intended by interchangeably using these terms nor should any be implied.

General Description

Turning to FIG. 1AA, the present invention in general introduces a portable, electronic, apparatus for displaying reading material, referred to hereinafter as an "e-book" 100, having an interface and appropriate on-board circuitry and programming to allow direct download of content from a provider. FIG. 1AA schematically illustrates a pocket-sized implementation, namely, similar in a height dimension to a paperback book, about six to seven inches. As will be explained in further detail, the e-book's "binding," or spine, 103 need only be an inch or more in cross-section, and may possibly be reduced to make the e-book 100 not much larger than a writing pen.

Figure 1B:
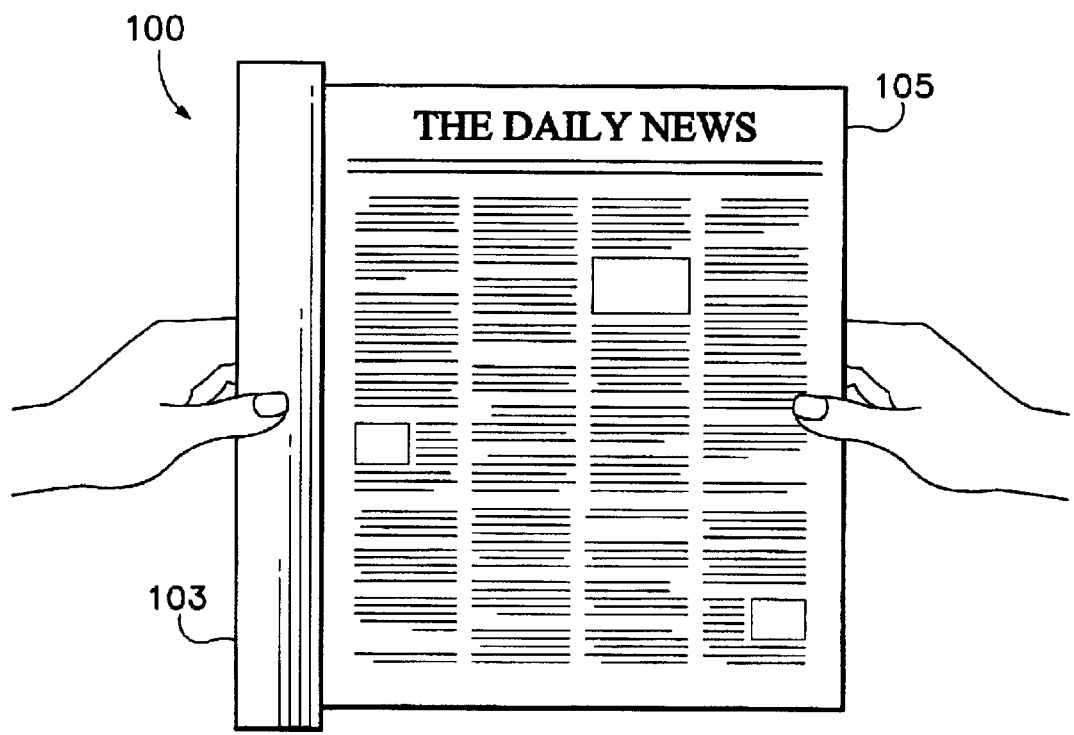
FIG. 1BB is a schematic illustration of an alternative embodiment of the present invention as shown in FIG. 1AA.

FIG. 1BB is an alternative embodiment of an e-book 100 in according with the present invention as shown in FIG. 1AA, being larger sized and more amenable to being carried in a briefcase, but thereby providing a much larger viewing area, e.g., comparable to a writing tablet size, hard copy magazine page, or the like.

Figure 2A:
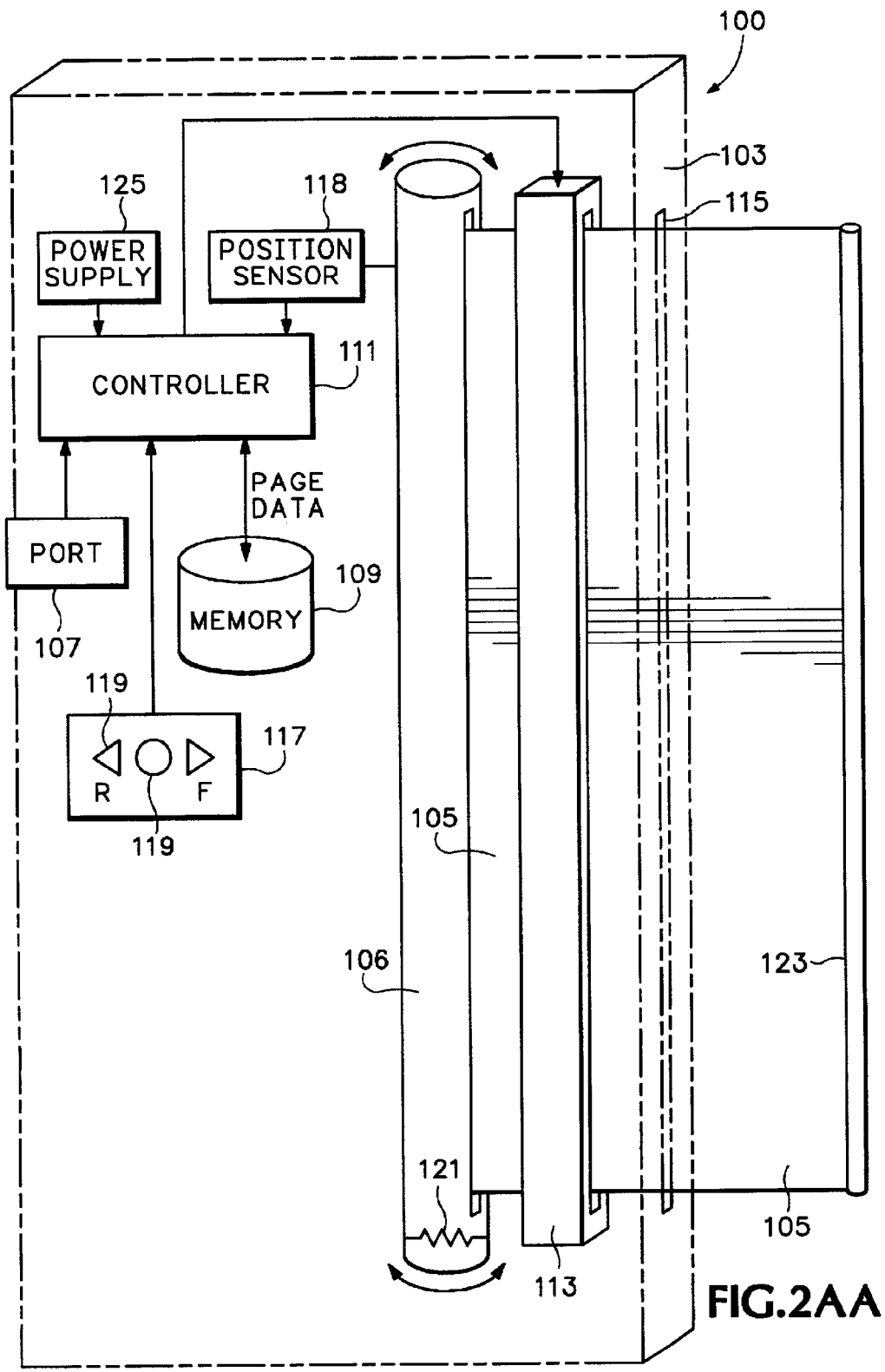
FIG. 2AA is a simplified, schematic block diagram of the present invention as shown in FIGS. 1AA and 1BB.
Figure 5A:
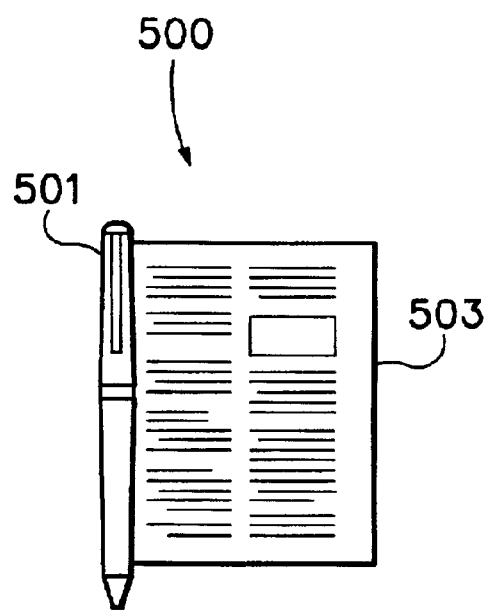
FIG. 5AA is a schematic illustration of an alternative embodiment of the present invention depicting an alternative implementation of the implementation of FIGS. 1AA and 1BB.
Figure 6A:
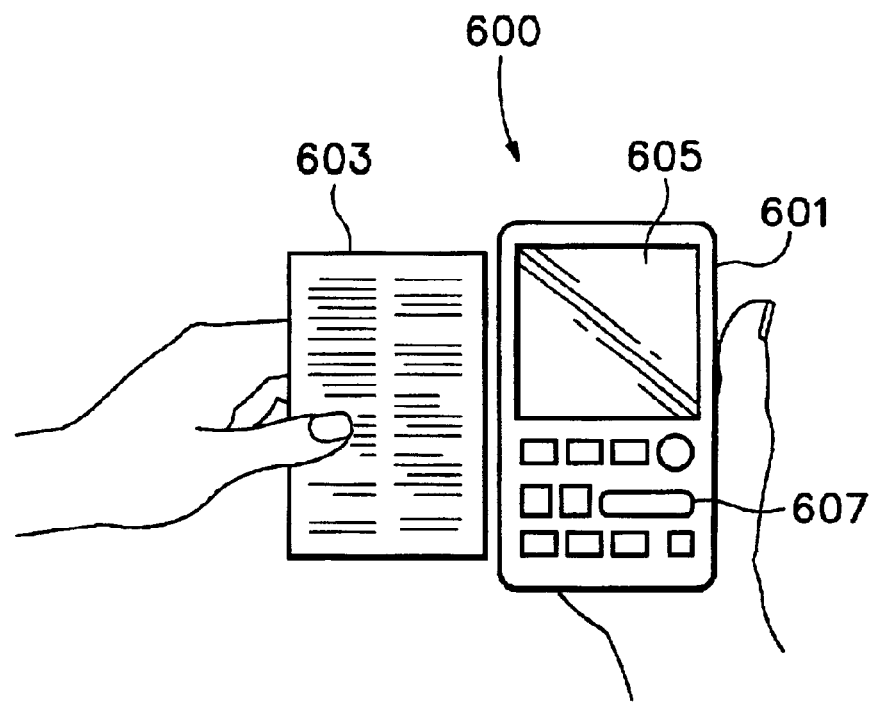
FIG. 6AA is a schematic illustration of another alternative embodiment of the present invention depicting an alternative implementation to the implementation of FIGS. 1AA and 1BB.

Looking to FIG. 2AA, the e-book 100 of the present invention includes a rewritable screen 105, an electrode array printing device 113, a media translation sensor 118, a reversible, biased, sheet payout device 106, and associated circuitry 107, 109, 111, 119, 125 to download, store, sequence, and erasably print on the screen text and image data. The e-book 100 has, preferably, a single, rewritable, viewing screen 105, using electronic colorant imaging technology. While the screen 105 could have a fixed geometry and orientation as known in the electronic book state of the art, as illustrated and later described with respect to FIGS. 1AA, 2AA, 3AA–3CC, and 5AA the preferred embodiment of the present invention includes a screen 105 that is retractable. In a very compact implementation, the e-book 500 is reduced to a pen-sized appliance 501 as illustrated in FIG. 5AA having a retractable screen 503. FIG. 6AA demonstrates an insertable and removable hard-card screen 603. Because of the nature of the screen 105 writing and erasing technology employed, it is an advantage of the present invention that only a single screen 105 is required.

The image and text content on the screen 105 is produced using an electronic colorant. Two commercially available technologies adaptable to implementations of the present invention are (1) the microcapsule electronic ink technology available from E-Ink Corporation and described by Jacobson, supra, incorporated herein by reference; and (2) the Xerox™ Gyricon™ microsphere technology available from Xerox Corporation as shown in U.S. Pat. No. 5,604,027 (Sheridon), incorporated herein by reference. Note that by definition, such an electronic colorant is substantively distinguished from current video screen technology that uses e.g., electron gun stimulated coatings, liquid crystals or the like, active transistors or diode elements, or other such devices, and by there very nature are not analogous thereto.

However, in the preferred and improved viewability embodiments over these two technologies, the rewritable viewing screen 105 uses a molecular colorant technology. The fundamentals of this field writeable and erasable, bi-modal and bistable molecular colorant technology are described in full in the common assignee's U.S. patent application Ser. No. 09/844,862, filed on Apr. 27, 2001, by Zhang et al., for a MOLECULAR MECHANICAL DEVICES WITH A BAND GAP CHANGE ACTIVATED BY AN ELECTRIC FIELD FOR OPTICAL SWITCHING APPLICATIONS; the Appendix of this application is a copy of appropriate specification pages and drawings thereof as relates to the present invention.

FIG. 2AA is a schematic block diagram of the e-book 100 apparatus in accordance with the present invention. A microprocessor-based controller 111 is provided and incorporated into the spine 103 for data management. The contents of a page, or pages, a book, or books, may be digitally downloaded through an input port 107 into a memory 109 housed in the book spine 103 via a conventional computer link or Internet access device (wired or wireless). Both contemporaneous page-by-page download—such as when actively connected to the World Wide Web—or complete download of the document into on-board memory 109 are available in accordance with the present invention. State-of-the-art computing handshake protocols are employed to ensure user identification, form of payment, copyright protection, and the like as is common to current Internet access and product purchase. Further details of such download apparatus and methodology are described hereinafter with respect to FIG. 7AA.

With the onset of the Internet age, end users are generally sophisticated computer device users and insistent upon both rapid and convenient data access. Though shown generically, it is preferred that the input port 107 be a state-of-the-art wireless radiowave or lightwave (including infrared) communications port. An employable method and apparatus for a public access system is described in detail in U.S. patent application Ser. No. 09/685,642 by Cohen, filed Oct. 10, 2000 (assigned to the common assignee herein and incorporated herein by reference) for PAY PER USE DIGITAL PHOTOGRAPHY, where public kiosk-type access for printing or transmitting digital photographs within a context boundary is described. Application of such a concept can be adapted for the present invention. For example, an airport terminal may supplement, or supplant a book store, with a kiosk for downloading written materials; indeed, with an appropriate on-board interface, such may be downloadable while in flight. It is also expressly considered that state of the art communication from the e-book to the publisher or other content provider such as by microwave communication, direct satellite up-links, and the like, can be employed. An object of the present invention is the ability to obtain any document, anytime, anyplace where some form of communications link can be established.

Alternatively, the spine 103 can be adapted to accommodate a state-of-the-art plug-in memory device (not shown). In a specific implementation such as shown in FIG. 1AA, size is optimized; in FIG. 1BB, more amenable to such plug-in memory devices, the specific implementation is also more concerned with providing a larger viewing screen at the cost to portability.

In operation, each document page is sequentially printed from memory 109 through a high resolution electrode array printhead 113. A variety of specific electrodes are fully described in the common assignee's U.S. patent application Ser. No. 09/981,131 filed by common inventor Vincent; a description is included hereinafter with respect to FIG. 4AA.

Figure 3A:
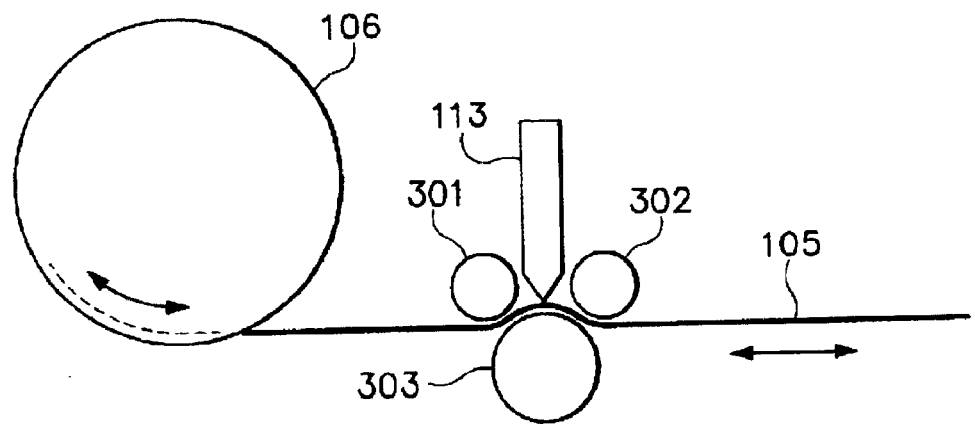
FIGS. 3AA cross sectional and 3BB, 3CC are sequential illustrations of the retraction-extraction steps of use of the present invention as shown in FIG. 1AA.
Figure 3B:
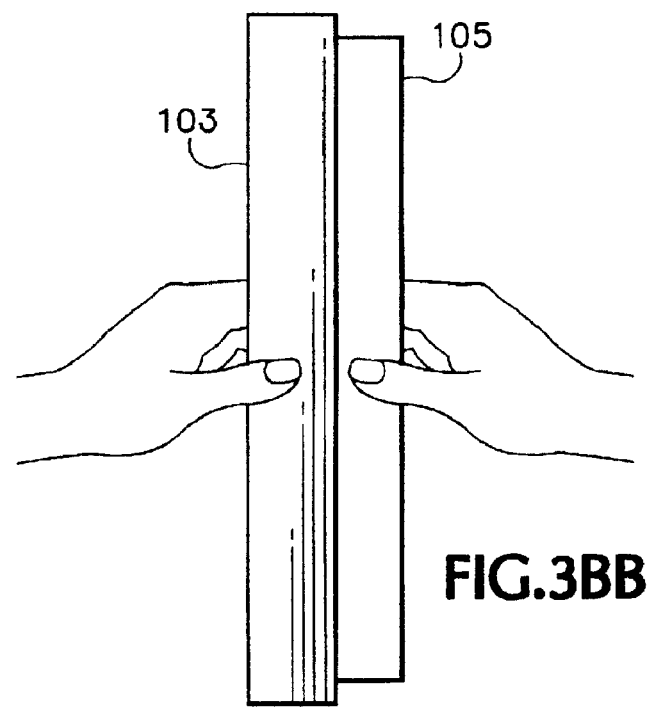
Figure 3C:
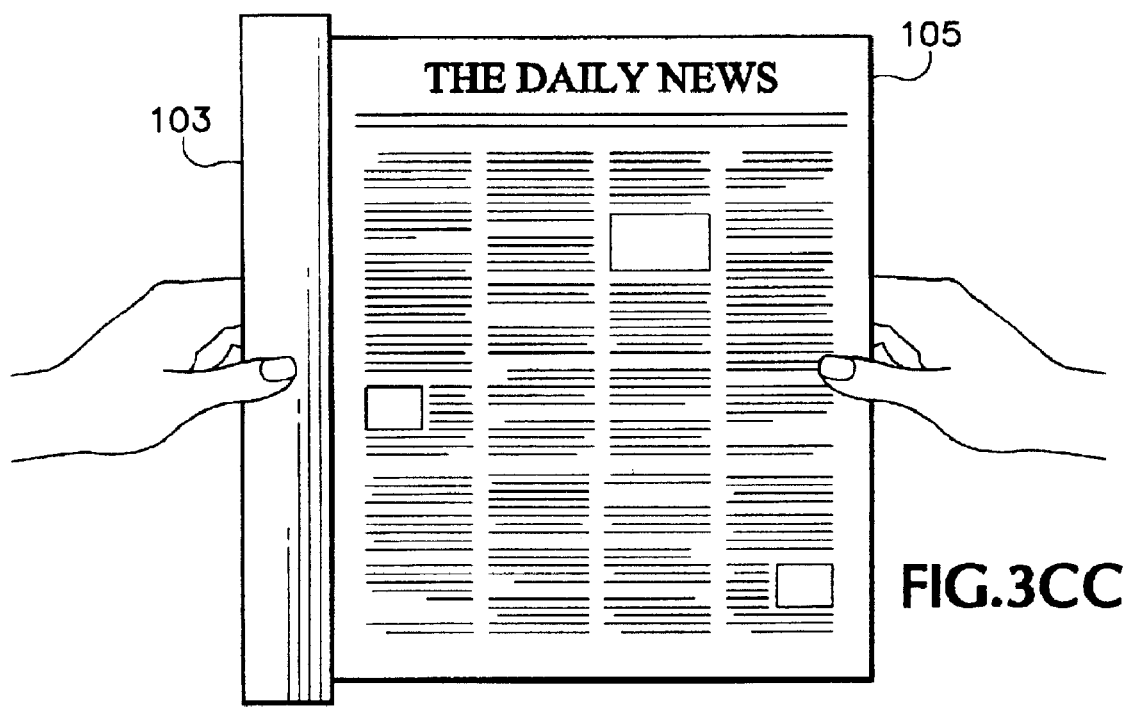

The viewing screen 105 is bias mounted, e.g., on a spring-loaded (represented by the double-headed arrows) cylinder 106, and pulled out of the spine 103 and retracted into the spine through a slot 115 in a manner as demonstrated in sequence by FIGS. 3AA–3CC. The microprocessor-based controller 111 can be pre-programmed for a simple download and sequential page turning operation, or an optional user control panel 117 can be provided on the spine 103, allowing user versatility. For example as demonstrated by FIGS. 3BB and 3CC, a first page of data from the Wall Street Journal newspaper is downloaded from the memory 109, transferred in a known manner data buffering operation to the printhead 113, and written as a current page while the screen 105 is being extracted from the spine 103, i.e., writing the current page during the position shift of the screen 105 from FIG. 3BB to FIG. 3CC. Cache memory (not shown) and associated data storage and buffering techniques can be provided for the controller 111.

Referring also to FIG. 3AA, screen support rollers 301, 302, 303 can be provided as needed for any specific implementation. Note also that one of the rollers can optionally also be an electrode apparatus or a position encoder. Once it is sensed that the screen 105 is fully extracted, a subsequent page is buffered for downloading from memory 109 to the printhead 113. Once the current page is read, the contents of a subsequent page is printed by allowing retraction of the screen 105 under the spring force back into the spine 103 (from FIG. 3BB position to FIG. 3AA position), which is sensed by the controller 111. As the screen 105 is extracted through the slot 115 a second time (FIG. 3AA position to FIG. 3BB position), the current page data is erased and the screen is reprinted with the new image data, the subsequent page. As the screen 105 has a bistable molecular colorant for imaging, as described hereinafter and in the Appendix, the erasing and rewriting can be simultaneous. Writing and erasing my be done during either the extraction or retraction motion of the screen, or both. Note that this motion is much like the motion of turning a hard copy book page.

Control buttons 119 on the spine 103 allow forward, "F," and reverse, "R," movement through the document, skipping to adjacent chapters and moving from one document to another, and the like. Note that in a sophisticated embodiment, controls can be provided for word and topic search functionality, such as by connecting a computer with keyboard to the controller 111 via the input port 107, or as demonstrated by FIG. 6AA by the provision of a menu and control function screen 605 on-board.

Once a reading session is completed, e.g., the reader is finished with the present page(s) on the screen 105, the screen is allowed to retract into the spine 103 to provide compact storage of the e-book 100. It thereby requires less storage space than the hard copy book(s) it replaces. Note that while the last page read is stored in memory 109, the last read page can be electronically retained on-screen, "book marked," via the bistable nature of the screen 105 without the need for a separate operation (e.g., in the nature of a virtual pointer as would be used in the prior art). A conventional pull tab or electronic feed (neither shown) can be provided in a known manner for facilitating extraction-retraction operations. An appliance operational menu(s) for using the control buttons may be displayed on the screen 105 or on a separate display (e.g., associated with the spine 103 or as shown in FIG. 6AA).

DESCRIPTION OF SPECIFIC EMBODIMENTS

The rewritable viewing screen 105 consists of a flexible substrate that has a viewing area using an electronic colorant thereon, preferably employing the bistable, bi-modal molecular colorant. The full details of specific rewritable mechanisms suited to adaptation to the present invention are set forth in co-inventor Vincent's U.S. patent application Ser. No. 09/919,394, filed Jul. 31, 2001 by Vincent et al. for a FIELD ADDRESSABLE REWRITABLE MEDIA (assigned to the common assignee and incorporated by reference in its entirety); the molecular colorant used for forming text and images is described in pertinent part in the Appendix hereto. For the main part, in order to be durable, the substrate of the screen 105 should be fabricated of a flexible, durable, material, such as of polymer-coated sheets of material selected from the group including at least flexible plastic, plasticized-paper compounds, or the like. The screen 105 itself in a preferred embodiment is a single sheet of the substrate having an associated layer or incorporation of the bistable, bi-modal molecular colorant described in detail in the Appendix hereto.

For the present invention, the molecular colorant has such molecules that are preferably black in a conjugated orientation and transparent in a less conjugated orientation. By making the screen substrate white, the rewritable screen 105 produces high contrast black and white images. The colorant may comprise a single field switchable black-transparent molecular system or multiple color molecular systems that collectively produce a composite black and includes full color imaging, providing a substantial improvement to the state of the art. By using bi-modal molecular colorant, the resolution of the produced image is limited only by the electric field resolution produced by the electrode array printhead 113 elements (see following details regarding FIG. 4AA). In other words, the picture elements, or "pixels," of the screen can be of a resolution of much smaller dimensions than achieved by particulates such as ink droplets (where commercial resolution is 1200 drops per inch) or controlled microcapsules (e.g., the Xerox bichromal balls or E-Ink Corporation's electronic ink). Depending upon the specific implementation, a pixel addressed by a printhead electrode may contain millions of bi-modal molecules in accordance with the present invention, rendering the notion of "resolution" an individual pixel meaningless. Specifically, to create a seamless set of pixels which render the conventional notion of resolution meaningless, an exemplary, molecular wire adaptable for printing pixels is described by Kuekes et al. in U.S. Pat. No. 6,128,214 for a MOLECULAR WIRE CROSSBAR MEMORY (assigned to the common assignee herein and incorporated herein by reference) and may be employed in accordance with the present invention for the printhead mechanism 113, particularly useful for full page printing in an embodiment such as that of FIG. 6AA. Moreover, the molecular colorant additionally has virtually instantaneous switching speed, beneficial to the needs of fast pagination. The colorant is preferably contained in a polymeric layer that may be optionally overcoated with a transparent protective or gloss control coating layer.

The viewing screen 105 may optionally contain a mosaic pixel pattern of different primary color colorants (e.g., red, green, blue or cyan, magenta, yellow). Such a pattern may be initially imaged onto the screen 105 through conventional printing means, for example, ink jet or lithography. The patterned colorants may be printed optionally with a fiducial mark to allow correct sensing of the colorant positions during electronic imaging. Microprocessor programming for full color displays may be provided. The pattern of colorants of each pixel may then be addressed by the printhead 113 electrode array to produce color images.

The printhead 113 comprises a sheet-wide linear array, or equivalent staggered array, of electrodes in contact or near contact with the screen 105 surface. Electrode arrays and drive electronics are common to electrostatic printers and their constructions and interfaces are well known. Each electrode 401 is sized, positioned, and electrically addressed in a known manner to provide an appropriate electric field to the colorant layer 405 at each given pixel location (or superset of pixels) along a pixel column (or columns if a staggered array) of the rewritable screen 105.

Figure 4A:
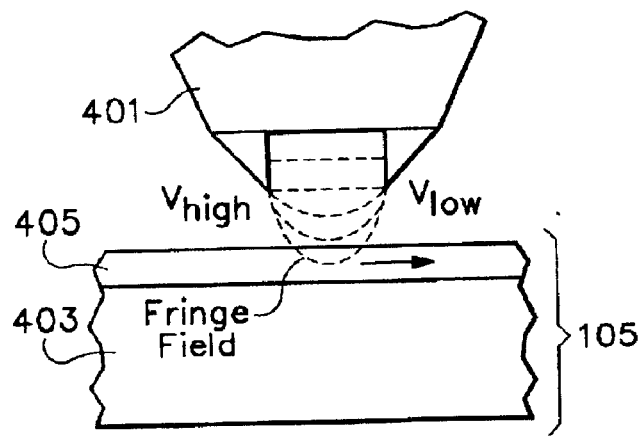
FIG. 4AA is an exemplary printhead electrode in accordance with the present invention as shown in FIG. 2AA.
Figure 4B:
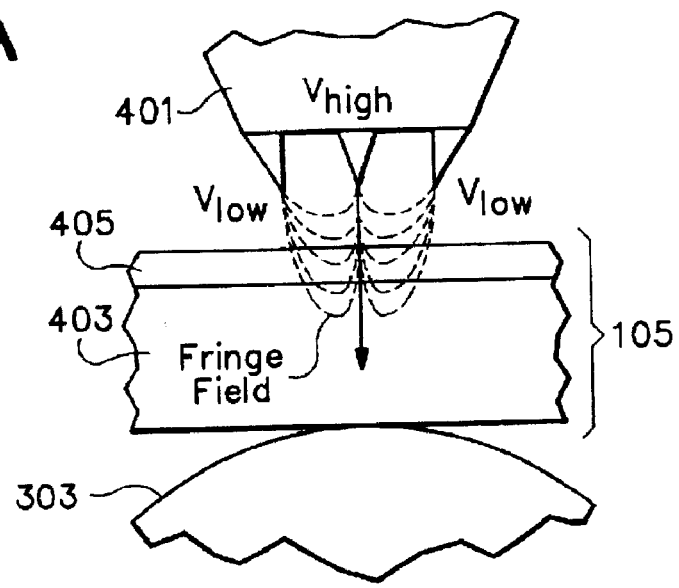
FIG. 4BB is an exemplary printhead electrode in an alternative embodiment to FIG. 4AA and in accordance with the present invention as shown in FIG. 2AA.

Exemplary "fringe field" electrodes are depicted in FIGS. 4AA and 4BB. The electrical field may be oriented perpendicular to the plane of the screen 105 or parallel to it. In the exemplary embodiment of FIG. 4AA, a common electrode, or electrodes, 401 is placed adjacent to the screen 105 pixel array so that printing is accomplished by passage of fringe fields through the colorant. Fringe field imaging is advantageous since the electric field is not significantly influenced by the physical structure of the substrate. The fringe field— illustrated by dashed-lines labeled "$V_{high}$" and "$V_{low}$". In the embodiment of FIG. 4AA, the field is concentrated under the electrode tip and the return field is dispersed and therefor does not effect the colorant 405 layer. As shown in FIG. 4BB, high and low voltage electrodes are used when the roller 303 is not biased. Returning to FIG. 3AA, a set of rollers 302, 303 may be used to maintain the desired spacing of screen 105 and printhead 113 electrode array. Only a linear array of electrodes 401 is required as each addressable pixel of the screen 105 passes by the printhead 113 during each retraction-extension cycle. Using standard semiconductor wafer, thin film processing to fabricate printhead elements, the packing density of the electrode array can be very great and produce a resolution far exceeding the human visual capability to discriminate individual dots of a dot matrix.

One end of the rewritable screen 105 is attached to the spring-loaded payout cylinder 106. The spring mechanism 121 of the cylinder 106 can be similar, if not identical, to a common window shade cylinder device. When the e-book 100 is not in use, the screen 105 is retracted by a bias force to wrap around the cylinder 106. As the screen 105 is extracted, the spring mechanism 121 coils. As with the window shade mechanism, the cylinder 106 may optionally contain a ratchet or detent mechanism (not shown) that holds the screen 105 in its extended, "read," position. To retract the screen 105, the user simply pulls the sheet to release the hold. Preferably, the unattached end of the screen 105 has a small attached stop 123, e.g., a bar or rod, that prevents the sheet from retracting into the spine 103 beyond an easily accessed pull point. The payout cylinder 106 may optionally contain, or be axially attached to, a small electric generator (not shown) that produces regenerative current for power supply 125 batteries or that provides or compliments the energy required to print the screen 105 as it is pulled out of the spine 103.

A known manner media translation sensor 118 is used to sense the instantaneous pixel row location of the screen 105 relative to the electrode array 113 to time printing pulses. This allows the user to extract the screen 105 at virtually any speed. The sensor 118 may also be used to detect the start and end positions of screen 105 travel. A number of different sensing schemes are applicable, including a shaft encoder attached to the axis of the wrap cylinder 106, or support roller 303, FIG. 3AA, engaged with the screen 105, a screen texture sensor (such as described in co-assigned U.S. Pat. No. 5,089,712), or a linear encoder positioned to read a coding track printed along the screen itself. The rewritable screen 105 is imaged by printing all pixel rows simultaneously, one or more columns of pixels at a time as the sheet is passed by the electrode array 113.

FIG. 6AA is an alternative embodiment of an e-book 600 having a conventional hard shell case, or housing, 601. A removable hard viewing screen 603 is provided, being written and erased in the same manner as the previously described embodiments. The housing 601 incorporates a menu screen 605 and a set of control buttons 607. Note that the menu screen 605 may incorporate the same molecular colorant technology in accordance with the present invention. Note that the control buttons 607 can be replaced with virtual buttons on the menu screen 605, providing greater flexibility. One advantage of this embodiment is that the screen 603, using a bistable molecular colorant can be held in the hand and manipulated with the same haptic convenience of a page of hard copy and the remainder of the apparatus 600 optionally can be left aside. Moreover, this embodiment is adaptable to the use of a complete personal digital assistant ("PDA") apparatus as the electronics and communication package associated with the hard-card screen 603. Thus, data input, storage, sequencing, and printing electronics for the electronic book 100 can be conventional to known manner computer related electronics.

In general, again referring to FIG. 2AA, data may be input using standard ROM or RAM cards (e.g., multi-megabyte PCMCIA cards or equivalent format disk drives) that contain the preloaded contents of a book, library of books, magazine, newspaper, or other document or documents. The data may optionally be downloaded into on-board memory 109 via wireless communications or cable or cableless (e.g., infrared) interface from a computer or computer peripheral device. Such downloading may be done by first passing a security code from the electronic book 100 to the document provider server to assure the safety of copyrighted material. The electronic book 100 preferably contains a standardized formatting instruction set to allow fast data transfer into the memory 109 with low document memory requirement; data compression techniques may be employed. When multiple documents are stored in the memory 109, the user selects from a printed list, or table of contents, on the screen 105, the downloaded document of choice, or simply starts printing pages to be read, by entering or toggling using the control buttons 119 located on the spine 103. Optionally, the spine 103 also can have a small, low power LCD or the like (not shown) to assist in the selection. Extracting the screen 105 prints the first selection. Once printed, the page sequencing electronics of the controller 111 automatically paginates to the next page whenever the screen 105 is retracted and extracted. This sequence may be overridden through key input along the spine controls 117 of the electronic book. Separate buttons or screen selections, for CONTENTS, PAGE, FORWARD and BACKWARD and the like to assist in the process can be provided. Provision can be made for multiple book marked pages to be automatically stored in memory 109 for each stored document so that a reader may return automatically to the last read page when re-selecting a document.

General Comments, Operations, and a Method of Doing Business

The present invention provides the high resolution, contrast, portability and compactness of commercial print media, at the distribution speed and cost advantage of Internet distributed media. Using these benefits, books, magazines, newspapers, and journals may be purchased on-line and downloaded via the Internet, replacing the necessity of purchasing the hard copy version. The electronic book may be used in place of standard computer displays for easier on-line reading. It provides superior pixel resolution with far simpler pixel addressing than common to flat panel displays. The bi-stable, rewritable, bi-modal molecular colorants employed are highly energy efficient, requiring energy only to change an image, not to hold it or illuminate it. This is in stark contrast to all computer displays and offers the potential of battery-operated, full portability. Unlike commercial flat panel displays, the present rewritable page contains a colored film analogous to printed ink films and is thereby readable at all viewing angles, under all ambient lighting conditions which might normally be encountered for book reading. The electronic book of this invention is ideally suited for e-commerce subscription with copyright security.

Internet, or the like, document providers may download documents to a subscriber via the Internet following a handshake between the connected electronic book and document server. Through the handshake, the book serial number or other security code sequence is passed to the server to assure that the document will be transferred only to the memory of the electronic book. In this instance, the electronic book is a read-only device incapable of passing the copyrighted document contents to other electronic devices. Since the majority of commercial book cost covers the cost of printing, binding, distributing and retail, e-commerce subscription can offer a significant cost savings to the customer while the content provider can receive even greater royalty for the content than through book publication. Automatic billing and payment for document downloading can be implemented by use of the e-book itself where the subscriber and provider have set up an appropriate accounting process or a document order-by-order payment can be implemented where the user uses another mechanism, e.g., a telephone call to the electronic document distributer, to order a specific document.

Figure 7A:
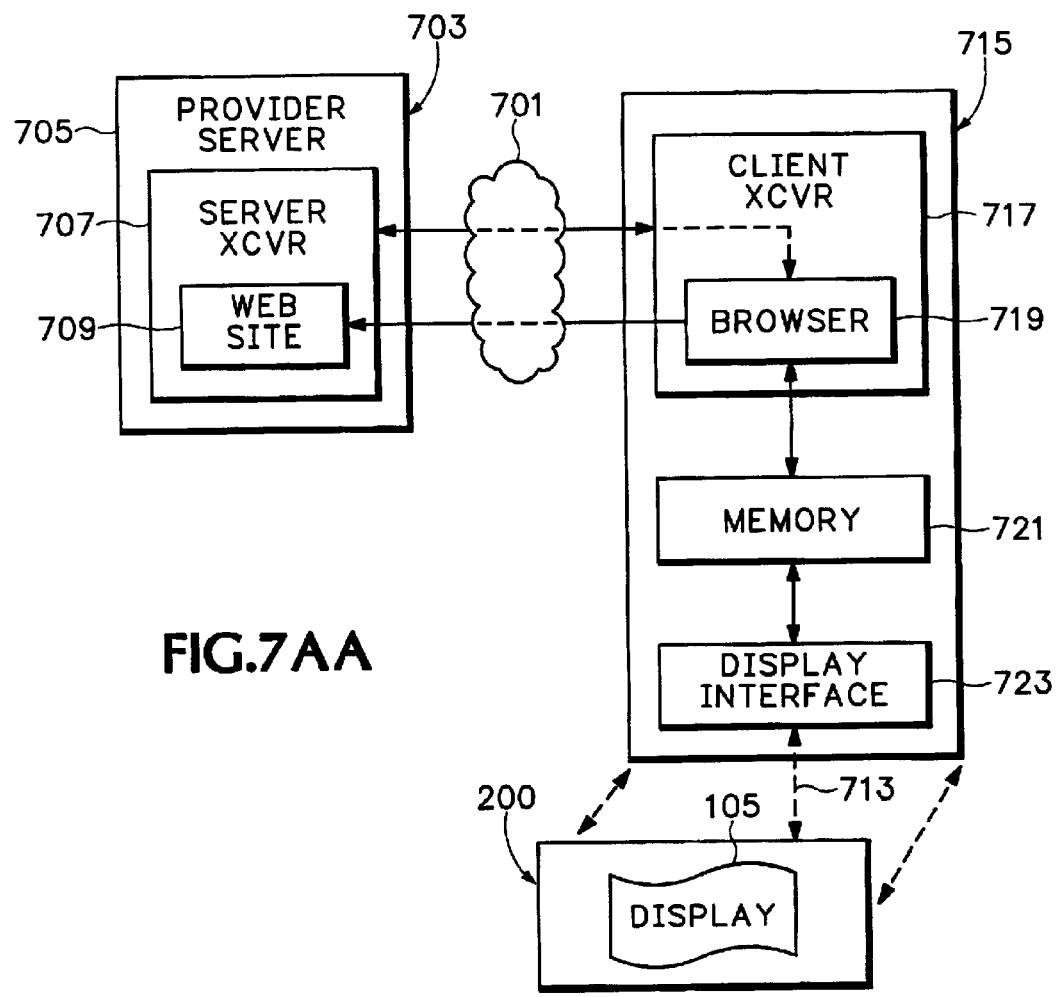
FIG. 7AA is a block diagram illustration for a method and apparatus for doing business over the internet in accordance with the present invention.

FIG. 7AA illustrates apparatus and methodology for a practical implementation of the present invention and a method of doing business. As illustrated by FIG. 7AA, wireless transceiver communication over the Internet (represented by cloud symbol 701) to, and document retrieval from, document content service provider(s) 703 is facilitated and greatly enhanced by the use of the technology in accordance with the present invention. The ability to find, select, obtain for a greatly reduced cost, and read a hard copy print quality display of any document on the internet, anywhere, anytime, on a fully portable appliance advances the state of the art significantly.

In general, the service "PROVIDER" 703 is an Internet or intranet accessible, computer server 705, having a wireless transceiver ("SERVER XCVR") interface 707. A client browser accessible WEB SITE 709 includes all of the communications programs for browsing, selecting, paying for, and downloading selected content, e.g., a novel.

A generically represented e-book 200 is provided with an on-board electronics package 715 (exploded, magnified, and represented as "on-board" the appliance 711 by dashed-arrow 713). Application specific integrated circuits ("ASIC") may be employed in implementing functions and programming associated with the invention. Included in the e-book 200 is an adapted implementation of the display screen 700 in accordance with the present invention.

The e-book 200 electronics package 715 includes a transceiver, "CLIENT XCVR," 717 adapted for communicating over the Internet 701 in a known manner. A BROWSER program 719 is provided for interactively communicating with the SERVER 705 web site 709. When the user of the e-book 200, the CLIENT, finds and purchases document content of interest, the content from the WEB SITE 709 is downloaded into the appliance memory 721 (it is known in the art to use data compression to limit the needed memory capacity to a reasonable size). Automatic downloads via subscription services for documents like daily newspapers (see FIG. 2AA) can be programmed. From memory, the CLIENT uses controls 201 to transfer pages of the document to the screen display 700.

Alternatively, or in addition to the wireless transceiver 717 interface, the telecommunications e-book 200 may include cable type interconnections for accessing the Internet 701.

In operation, as sent by the PROVIDER 703 from the WEB SITE 709, a first extracted page from the memory 721 transferred onto the display 700 will initially show in progressive order a menu, or index, of available document services, document categories, and document titles (and preferably an abstract of the content). The CLIENT can then use the BROWSER 719 as an interface. The CLIENT can place an order in real time, paying the invoiced amount—e.g., via a charge card or other credit information related data exchange with the PROVIDER 703, such as by having an account related to the e-book 200 serial number (analogous to a long distance telephone call)—and downloading the document immediately or at a later, convenient time. An attractive commercial implementation is for the PROVIDER 703 to offer any CLIENT the ability to obtain otherwise subscription documents such as newspapers, magazines, and the like, on a pay-per-view, non-subscription basis at a low cost as hard copy printing and mailing costs are eliminated. In placing an order, the display 700 is used to show ordering information, menus, lists, virtual shopping cart contents, and the like, provided by the from the SERVER 705 over the internet 701.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of . . . "

APPENDIX

Molecules evidencing one of several new types of switching are provided for the colorant layer 101. That is to say, the present invention introduces several new types of switching mechanisms that distinguish it from the prior art:

(1) an electric field ("E-field") induced rotation of at least one rotatable section (rotor) or a molecule to change the band gap of the molecule; .

(2) E-field induced charge separation or recombination of the molecule via chemical bonding change to change the band gap; and (3) E-field induced band gap change via molecular folding or stretching.

Thus, the color switching is the result of an E-field induced intramolecular change rather than a diffusion or oxidation/reduction reaction, in contrast to prior art approaches. Also, the part of the molecule that moves is quite small, so the switching time is expected to be quite fast Also, the molecules are much simpler and thus easier and cheaper to make than the rotaxanes, catenanes, and related compounds.

The following we examples of model molecules with a brief description of their function:

(1) E-field induced band gap change via molecular conformation change (rotor/stator type of model)—FIGS. 4 and 5*a–e;*

(2a) E-field-induced band gap change caused by the change of extended conjugation via charge separation or recombicaton accompanied by increasing or decreasing band localization—FIG. 6*a;*

Figure 6A:
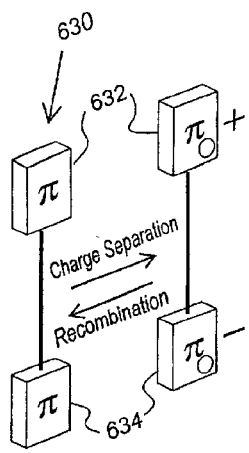
Figure 6B:
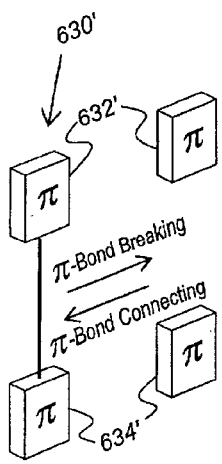

(2b) E-field-induced band gap change caused by change of extended conjugation via charge separation or recombination and π-bond breaking or formation—FIG. 6*b*; and (3) E-field induced band gap change via molecular folding or stretching.

Each model, with supporting examples, is discussed below. However, the examples given are not to be considered limiting the invention to the specific molecular systems illustrated, but rather merely exemplary of the above switching mechanisms.

Figure 5A:
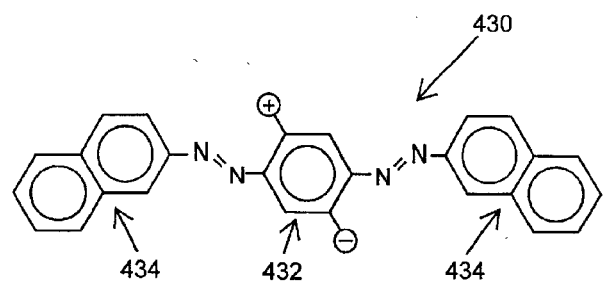
Figure 5B:
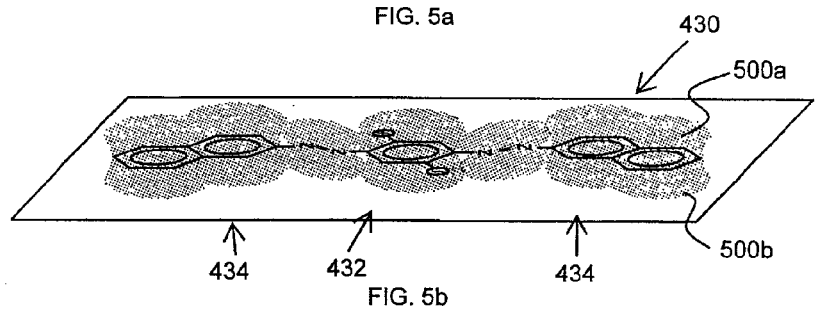
Figure 5C:
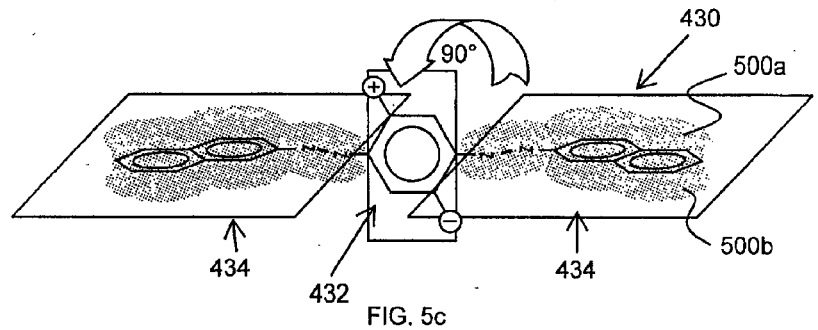
Figure 4:
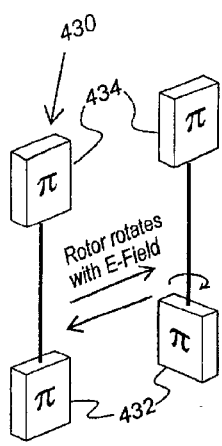

Model (1): E-Field-Induced Band Gap Change Via Molecular Conformation Change (Rotor/Stator Type of Model):

FIG. 4 is a schematic depiction of one embodiment of this model, which involves an E-field-induced band gap change via molecular conformation change (rotor/stator type of model). As shown in FIG. 4, the molecule 430 comprises a rotor portion 432 and a stator portion 434. The rotor portion 432 rotates with an applied electric field. In one state, depicted on the left side of the drawing, there is an extended conjugation through the entire molecule, resulting in a relatively smaller band gap and thereby longer wavelength (red-shifted) photo-absorption. In the other state, following rotation of the rotor, depicted on the right side of the drawing, the extended conjugation is changed, resulting in a relatively larger band gap and thereby shorter wavelength (blue-shifted) photo-absorption. FIGS. 5*a*–5*c* depict an alternate, and preferred, embodiment of this Model 1; these latter Figures are discussed in connection with Examples 1 and 2 of this Model 1 below.

The following requirements must be met in this model:

(a) The molecule must have at least one rotor segment and at least one stator segment;

(b) In one state of the molecule, there should be delocalized HOMOs and/or LUMOs (π-states and/or non-bonding orbitals) that extend over a large portion of the molecule (rotor(s) and stator(s)), whereas in the other state, the orbitals are localized on the rotor(s) and stator(s), and other segments;

(c) The connecting unit between rotor and stator can be a single σ-bond or at least one atom with (1) non-bonding electrons (p or other electrons), or (2) π-electrons, or (3) π-electrons and non-bonding electron(s);

(d) The non-bonding electrons, or π-electrons, or π-electrons and non-bonding electron(s) of the rotor(s) and stators) can be localized or de-localized depending on the conformation of the molecule, while the rotor rotates when activated by an E-field;

(e) The conformation(s) of the molecule can be E-field dependent or bi-stable;

(f) The bi-stable state(s) can be achieved by infra- or inter-molecular forces such as hydrogen bonding, Coulomb three, van der Waals force, metal ion complex or dipole inter-stabilization; and (g) The band gap of the molecule will change depending on the degree of non-bonding electron, or π-electron, or π-electron and non-bonding electron de-localization of the molecule. This will control the optical properties (e.g., color and/or index of refraction, etc.) of the molecule.

Following are two examples of this model (Examples 1 and 2):

The novel bi-modal molecules of the present invention are active optical devices that can be switched with an external electric field. Preferably, the colorant molecules are bi-stable. The general idea is to design into the molecules a rotatable middle segment (rotor) 432 that has a large dipole moment (see Examples 1 and 2) and that links two other portions of the molecule 430 that are immobilized (stators) 434. Under the influence of an applied electric field, the vector dipole moment of the rotor 432 will attempt to align parallel to the direction of the external field. However, the molecule 430 is designed such that there are inter- and/or infra-molecular forces, such as hydrogen bonding or dipole-dipole interactions as well as steric repulsions, that stabilize the rotor 432 in particular orientations with respect to the stators 434, Thus, a large electric field is required to cause the rotor 432 to unlatch from its initial orientation and rotate with respect to the stators 434.

Once switched into a particular orientation, the molecule 430 will remain in that orientation until it is switched to a different orientation, or reconfigured. However, a key component of the molecule design is that there is a steric repulsion or hindrance that will prevent the rotor 432 from rotating through a complete 180 degree half cycle. Instead, the rotation is halted by the steric interaction of bulky groups on the rotor 432 and stators 434 at an optically significant angle of typically between 10° and 170° from the initial orientation. For the purposes of illustration, this angle is shown as 90° in the present application. Furthermore, this switching orientation may be stabilized by a different set of inter- and/or infra-molecular hydrogen bonds or dipole interactions, and is thus latched in place even after the applied field is tuned off. For bi- or multi- stable colorant molecules, this ability to latch the rotor 432 between two states separated by an optically significant rotation from the stators is crucial.

The foregoing strategy may be generalized to design colorant molecules to provide several switching steps so as to allow multiple states (more than two) to produce a multi-state (e.g., multi-color) system. Such molecules permit the optical properties of the colorant layer to be tuned continuously with a decreasing or increasing electric field, or changed abruptly from one state to another by applying a pulsed field.

Further, the colorant molecules may be designed to include the case of no, or low, activation barrier for fast but volatile switching. In this latter situation, bi-stability is not required, and the molecule is switched into one state by the electric field and relaxes back into its original state upon removal of the field ("bi-modal"). In effect, these forms of the bi-modal colorant molecules are "self-erasing". In contrast, with bi-stable colorant molecules, the colorant molecule remains latched in its stale upon removal of the field (non-volatile switch), and the presence of the activation barrier in that case requires application of an opposite field to switch the molecule back to its previous state.

When the rotor 432 and stators 434 are all co-planar, the molecule is referred to as "more-conjugated". Thus, the non-bonding electrons, or π-electrons, or π-electrons and non-bonding electrons of the colorant molecule, through its highest occupied molecular orbital (HOMO) and lowest unoccupied molecular orbital (LUMO), are delocalized over a large portion of the molecule 430. This is referred to as a "a red-shifted state" for the molecule, or "optical state I". In the case where the rotor 432 is rotated out of conjugation by approximately 90° with respect to the stators 434, the conjugation of the molecule 430 is broken and the HOMO and LUMO are localized over smaller portions of the molecule, referred to as "less-conjugated". This is a "blue-shifted state" of the molecule 430, or "optical state II". Thus, the colorant molecule 430 is reversibly switchable between two different optical states.

It will be appreciated by those skilled in the art that in the ideal case, when the rotor 432 and stators 434 are completely coplanar, then the molecule is fully conjugated, and when the rotor 432 is rotated at an angle of 90° with respect to the stators 434, then the molecule is non-conjugated. However, due to thermal fluctuations, these ideal stales we not fully realized, and the molecule is thus referred to as being "more-conjugated" in the former case and "less-conjugated" in the latter case. Further, the terms "red-shifted" and "blue-shifted" are not meant to convey any relationship to hue, but rather the direction in the electromagnetic energy spectrum of the energy shift of the gap between the HOMO and LUMO states.

Examples 1 and 2 show two different orientations for switching the molecules. Example 1a below depicts a first generic molecular example for this Model 1.

Example 1a

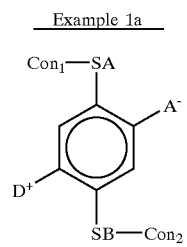

| | |
|---|---|
| $Con_1$ | Connecting Group |
| $Con_2$ | Connecting Group |
| SB | Stator B |
| SA | Stator A |
| $A^-$ | Acceptor (Electron withdrawing group) |
| $D^+$ | Donor (Electron donating group) | where:

The letter $A^-$ represents an Acceptor group; it is an electron-withdrawing group. It may be one of the following: hydrogen, carboxylic acid or its derivatives, sulfuric acid or its derivatives, phosphoric acid or its derivatives, nitro, nitrile, hetero atoms (e.g., N, O, S, P, F, Cl, Br), or functional groups with at least one of above-mentioned hetero atoms (e.g., OH, SH, NH, etc.), hydrocarbons (either saturated or unsaturated) or substituted hydrocarbons.

The letter $D^+$ represents a Doner group; it is an electron-donating group. It may be one of following: hydrogen, amine, OH, SH, ether, hydrocarbon (either saturated or unsaturated), or substituted hydrocarbon or functional group with at least one of hetero atom (e.g., B, Si, I, N, O, S, P). The donor is differentiated from the acceptor by that fact that it is less electronegative, or more electropositive, than the acceptor group on the molecule.

The letters $Con_1$ and $Con_2$ represent connecting units between one molecule and another molecule or between a molecule and the solid substrate (e.g., metal electrode, inorganic or organic substrate, etc.). They may be any one of the following: hydrogen (utilizing a hydrogen bond), multivalent hetero atoms (i.e., C, N, O, S, P, ect.) or functional groups containing these hetero atoms (e.g., NH, PH, etc.), by hydrocarbons (either saturated or unsaturated) or substituted hydrocarbons.

The letters SA and SB are used here to designate Stator A and Stator B. They may be a hydrocarbon (either unsaturated or saturated) or substituted hydrocarbon. Typically, these hydrocarbon units contain conjugated rings that contribute to the extended conjugation of the molecule when it is in a planar stare (red shifted state). In those stator units, they may contain the bridging group $G_n$ and/or the spacing group $R_n$. The bridging group (e.g., acetylene, ethylene, amide, imide, imide, azo, etc.) is typically used to connect the stator to the rotor or to connect two or more conjugated rings to achieve a desired chromophore. The connector may alternately comprise a single atom bridge, such as an ether bridge with an oxygen atom, or a direct sigma bond between the rotor and stator. The spacing groups (e.g., phenyl, isopropyl or tert-butyl, etc.) are used to provide an appropriate 3-dimensional scaffolding to allow the molecules to pack together while providing space for each rotor to rotate over the desired range of motion.

Example 1b below is a real molecular example of Model 1. In Example 1b, the rotation axis of the rotor is designed to he nearly perpendicular to the net current-carrying axis of the molecules, whereas in Example 2, the rotation axis is parallel to the orientation axis of the molecule. These designs allow different geometries of molecular films and electrodes to be used, depending on the desired results.

Example 1b

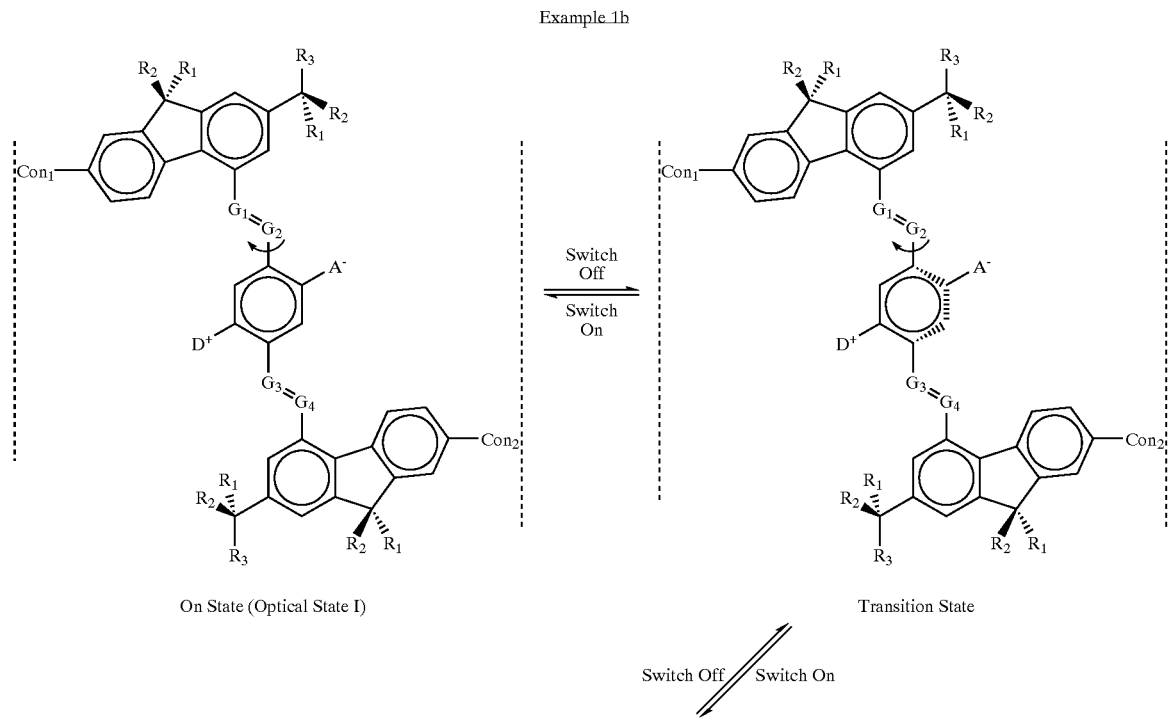

On State (Optical State I)   Transition State

Switch Off / Switch On

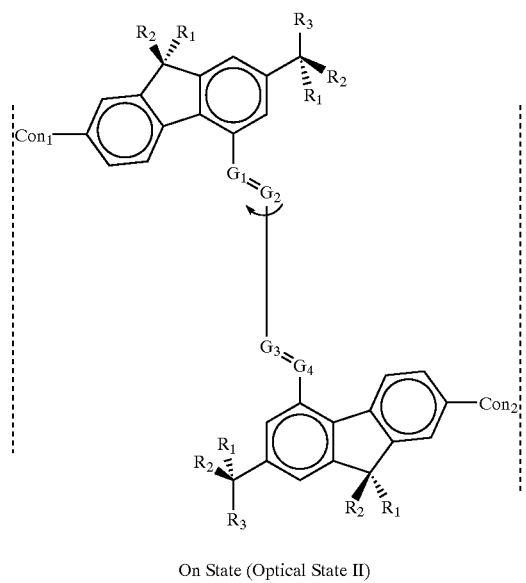

On State (Optical State II)

where:

The letter A⁻ is an Acceptor group; it is an electron-withdrawing group. It may be one of following: hydrogen, carboxylic acid or its derivatives, sulfuric acid or its derivatives, phosphoric acid or its derivatives, nitro, nitrile, hetero atoms (e.g., N, O, S, P, F, Cl, Br), or functional group with at least one of above-mentioned hetero atoms (e.g., OH, Sit NH, etc.), hydrocarbon (either saturated or unsaturated) or substituted hydrocarbon.

The letter D⁺ represents a Donor group; it is an electron-donating group. It may be one of following: hydrogen, amine, OH, SH, ether, hydrocarbon (either saturated or unsaturated), or substituted hydrocarbon or functional group with at least one of hetero atom (e.g., B, Si, I, N, O, S, P). The donor is differentiated from the acceptor by that fact that it is less electronegative, or more electropositive, than the acceptor group on the molecule.

The letters Con₁ and Con₂ represent connecting units between one molecule and another molecule or between a molecule and the solid substrate (e.g. metal electrode, inorganic or organic substrate, etc.). They may be any one of the following: hydrogen (utilizing a hydrogen bond), multivalent hetero atoms (i.e., C, N, O, S, P, etc.) or functional groups containing these hetero atoms (e.g., NH, PH, etc.), hydrocarbons (either saturated or unsaturated) or substituted hydrocarbons.

Letters R₁, R₂, R₃ represent spacing groups built into the molecule. The function of these spacer units is to provide an appropriate 3-dimensional scaffolding to allow the molecules to pack together while providing rotational space for each rotor. They maybe any one of the following: hydrogen, hydrocarbon (either saturated or unsaturated) or substituted hydrocarbon.

Letters G₁, G₂, G₃, and G₄ are bridging groups. The function of these bridging groups is to connect the stator and rotor or to connect two or more conjugated rings to achieve a desired chromophore. They may be any one of the following: hetero atoms (e.g., N, O, S, P, etc.) or functional groups with at least one of above-mentioned hetero atoms (e.g., NH or NHNH, etc.), hydrocarbons (either saturated or unsaturated) or substituted hydrocarbons. The connector may alternately comprise a single atom bridge such as an ether bridge with an oxygen atom, or a direct sigma bond between the rotor and stator.

In Example 1b above, the vertical dotted lines represent other molecules or solid substrates. The direction of the switching field is perpendicular to the vertical dotted lines. Such a configuration is employed for electrical switching; for optical switching, the linking moieties may be eliminated, and the molecule may he simply placed between the two electrodes They may also be simply used to lint: one molecule to another molecule or a molecule to an organic or inorganic solid substrate. Referring to FIG. 5a, the molecule shown above (Example 1b) has been designed with the internal rotor 432 perpendicular to the orientation axis of the entire molecule 430. In this case, the external field is applied along the orientation axis of the molecule 430 as pictured—the electrodes (vertical dotted lines) are oriented perpendicular to the plane of the paper and perpendicular to the orientation axis of the molecule 430. Application of an electric field oriented from left to right in the diagrams will cause the rotor 432 as pictured in the upper diagram to rotate to the position shown on the lower right diagram, and vice versa. In this case, the rotor 432 as pictured in the lower right diagram is not coplanar with the rest of the molecule, so this is the blue-shifted optical state of the molecule, whereas the rotor is coplanar with the rest of the molecule an the upper diagram, so this is the red-shifted optical state of the molecule. The structure shown in the lower left diagram depicts the transition state of rotation between the upper diagram (co-planar, conjugated) and the lower right diagram (central portion rotated, non-conjugated).

The molecule depicted in Example 1b is chromatically transparent or blue-shifted. In the conjugated state, the molecule is colored or is red-shifted.

For the molecules in Example 1b, a single monolayer molecular film is grown, for example using Langmuir-Blodgett techniques or self-assembled monolayers, such that the orientation axis of the molecules is perpendicular to the plane of the electrodes used to switch the molecules. Electrodes may be deposited in the manner described by Collier et al, supra, or methods described in the above-referenced patent applications and issued patent. Alternate thicker film deposition techniques include vapor phase deposition, contact or ink-jet printing, or silk screening.

Example 2a below depicts a second generic molecular example for this Model 1.

Example 2a

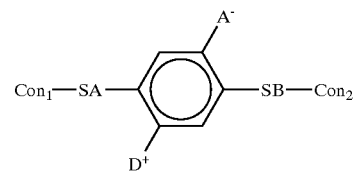

| | |
|---|---|
| Con₁ | Connecting Group |
| Con₂ | Connecting Group |
| SB | Stator B |
| SA | Stator A |
| A⁻ | Acceptor (Electron withdrawing group) |
| D⁺ | Donor (Electron donating group) | where:

The letter A⁻ is an Acceptor group; it is an electron-withdrawing group. It may be one of following: hydrogen, carboxylic acid or its derivatives, sulfuric acid or its derivatives, phosphoric acid or its derivatives, nitro, nitrite, hetero atoms (e.g., N, O, S, P, F, Cl, Br), or functional group with at least one of above-mentioned hetero atoms (e.g., OH, SH, NH, etc.), hydrocarbon (either saturated or unsaturated) or substituted hydrocarbon.

The letter D⁺ represents a Donor group; it is an electron-donating group. It may be one of following: hydrogen, amine, OH, SH, ether, hydrocarbon (either saturated or unsaturated), or substituted hydrocarbon or functional group with at least one of hetero atom (e.g., B, Si, I, N, O, S, P). The donor is differentiated from the acceptor by that fact that it is less electronegative, or more electropositive, than the acceptor group on the molecule.

The letters Con₁ and Con₂ represent connecting units between one molecule and another molecule or between a molecule and the solid substrate (e.g., metal electrode, inorganic or organic substrate, etc.). They may be any one of the following: hydrogen (utilizing a hydrogen bond), multivalent hetero atoms (i.e., C, N, O, S, P, etc.) or functional groups containing these hetero atoms (e.g., NH, PH, etc.), hydrocarbons (either saturated or unsaturated) or substituted hydrocarbons.

The letters SA and SB are used here to designate Stator A and Stator B. They can be a hydrocarbon (either unsaturated or saturated) or substituted hydrocarbon. Typically, these hydrocarbon units contain conjugated rings that contribute to the extended conjugation of the molecule when it is in a planar state (red shifted state). In those stator units, they may contain bridging groups $G_n$ and/or spacing groups $R_n$. A bridging group is typically used to connect the stator and rotor or to connect two or more conjugated rings to achieve a desired chromophore The connector may alternately comprise a single atom bridge, such as an ether bridge with an oxygen atom, or a direct sigma bond between the rotor and stator. A spacing group provides an appropriate 3-dimensional scaffolding to allow the molecules to pack together while providing rotational space for each rotor.

Example 2h below is another real molecular example of Model 1.

where:

The letter $A^-$ is an Acceptor group; it is an electron-withdrawing group. It may be one of following: hydrogen, carboxylic acid or its derivatives, sulfuric acid or its derivatives, phosphoric acid or its derivatives, nitro, nitrite, hetero atoms (e.g., N, O, S, P, F, Cl, Br), or functional group with at least one of above-mentioned hetero atoms (e.g., OH, SH, NH, etc.), hydrocarbon (either saturated or unsaturated) or substituted hydrocarbon.

The letter $D^+$ represents a Donor group; it is an electron-donating group. It may be one of following: hydrogen, amine, OH, SH, ether, hydrocarbon (either saturated or unsaturated), or substituted hydrocarbon or functional group with at least one of hetero atom (e.g., B, Si, I, N, O, S, P).

Example 2b

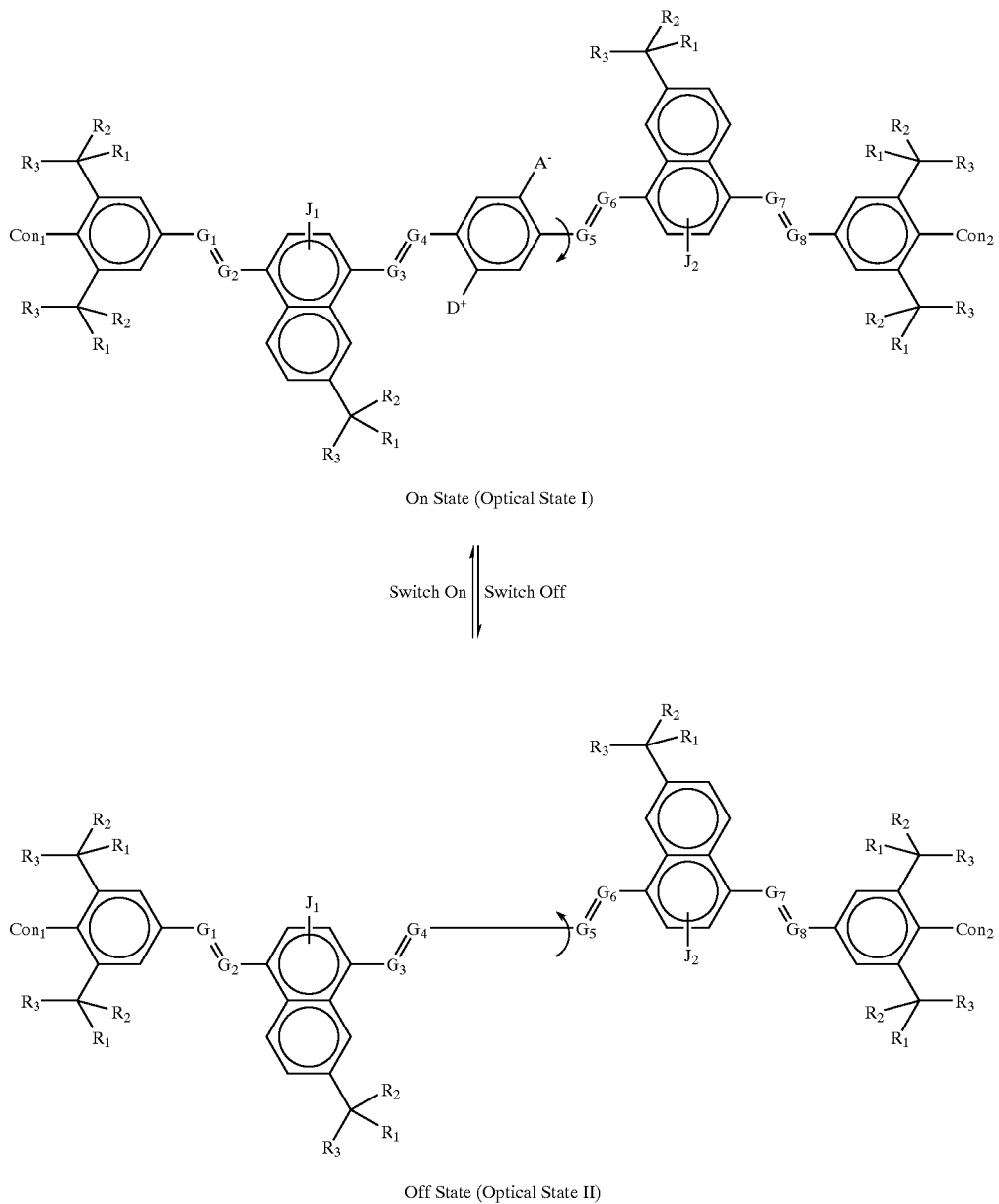

On State (Optical State I)

Switch On | Switch Off

Off State (Optical State II)

The donor is differentiated from the acceptor by that fact that it is less electronegative, or more electropositive, than the acceptor group on the molecule.

The letters $Con_1$ and $Con_2$ represent connecting units between one molecule and another molecule or between a molecule and the solid substrate (e.g., metal electrode, inorganic or organic substrate, etc.). They may be any one of the following: hydrogen (utilizing a hydrogen bond), multivalent hetero atoms (i.e., C, N, O, S, P, etc.) or functional groups containing these hetero atoms (e.g., NH, PH, etc.), hydrocarbons (either saturated or unsaturated) or substituted hydrocarbons.

The letters $R_1$, $R_2$ and $R_3$ represent spacing groups built into the molecule. The function of these spacer units is to provide an appropriate 3-dimensional scaffolding to allow the molecules to pack together while providing rotational space for each rotor. They may be any one of the following: hydrogen, hydrocarbon (either saturated or unsaturated) or substituted hydrocarbon.

The letters $G_1$, $G_2$, $G_3$, $G_4$, $G_5$, $G_6$, $G_7$, and $G_8$ are bridging groups. The function of these bridging groups is to connect the stator and rotor or to connect two or more conjugated rings to achieve a desired chromophore. They may be any one of the following: hetero atoms (e.g., C, N, O, S, P, etc.) or functional group with at least one of above-mentioned hetero atoms (e.g., NH or NHNH, etc.), hydrocarbons (either saturated or unsaturated) or substituted hydrocarbons, The connector may alternately comprise a single atom bridge such as an ether bridge with an oxygen atom, or a direct sigma bond between the rotor and stator.

The letters $J_1$ and $J_2$ represent timing groups built into the molecule. The function of these tuning groups (e.g., OH, NHR, COOH, CN, nitro, etc.) is to provide an appropriate functional effect (e.g. both inductive effect and resonance effects) and/or steric effects. The functional effect is to time the band gap ($\Delta E_{HOMO/LUMO}$) of the molecule to get the desired electronic as well as optical properties of the molecule. The steric effect is to tune the molecular conformation through steric hindrance, inter- or infra-molecular interaction forces (e.g. hydrogen bonding, Coulomb interaction, van der Waals forces) or to provide bi- or multiple-stability of molecular orientations. They may be any one of the following: hydrogen, hetero atoms (e.g., N, O, S, P, B, F, Cl, Br, and I), functional groups with at least one of above-mentioned hetero atoms, hydrocarbons (either saturated or unsaturated) or substituted hydrocarbons.

The molecule shown above (Example 2b) has been designed with the internal rotor parallel to the orientation axis of the entire molecule. In this case, the external field is applied perpendicular to the molecular axis—the electrodes are oriented parallel to the long axis of the molecule and can be either nominally perpendicular or parallel to the plane of the above model structures. For example, application of an electric field to the upper molecule shown above where the field lines are perpendicular to the molecular axis and pointing upward will raise the rotor as pictured in that diagram to rotate to approximately 90 degrees and appear edge on, as shown in the lower molecular diagram above, and vice versa. In this case, the rotor as pictured in the lower diagram is not coplanar with the rest of the molecule, so this is the blue-shifted optical state of the molecule, or optical state II, whereas the rotor is coplanar with the rest of the molecule on the upper diagram, so this is the red-shifted optical state of the molecule, or optical state I. The letters N, H, and O retain their usual meaning.).

FIG. 5a depicts molecules similar to those of Examples 1b and 2b, but simpler, comprising a middle rotor portion 432 and two end stator portions 434. As in Examples 1b and 2b, the rotor portion 432 comprises a benzene ring that is provided with substituents that render the rotor with a dipole. The two stator portions 434 are each covalently bonded to the benzene ring through an azo linkage, and both portions comprise an aromatic ring.

FIG. 5b is a schematic representation (perspective), illustrating the planar state, with the rotor 432 and stators 434 all co-planar. In the planar state, the molecule 430 is fully conjugated, evidences color (first spectral or optical state), and is comparatively more electrically conductive. The conjugation of the rings is illustrated by the π-orbital clouds 500a, 500b above and below, respectively, the plane of the molecule 430.

FIG. 5c is also a schematic representation (perspective), illustrating the rotated state, with the rotor 432 rotated 90° with respect to the stators 434, which remain co-planar. In the rotated state, the conjugation of the molecule 430 is broken. Consequently, the molecule 430 is transparent (second spectral or optical state) and comparatively less electrically conductive.

For the molecules of Example 2b, the films are constructed such that the molecular axis is parallel to the plane of the electrodes. This may involve films that are multiple monolayers thick. The molecules form solid-state or liquid crystals in which the large stator groups are locked into position by intermolecular interactions or direct bonding to a support structure, but the rotor is small enough to move within the lattice of the molecules. This type of structure can be used to build an E-field controlled display or used for other applications as mentioned earlier herein.

Model (2a): E-Field Induced Band Gap Change Caused by the Change of Extended Conjugation via Charge Separation or Recombination Accompanied by Increasing or Decreasing Band Localization:

FIG. 6a is a schematic depiction of this model, which involves an E-field-induced band gap change caused by the change of extended conjugation via charge separation or recombination accompanied by increasing or decreasing band localization. As shown in FIG. 6a, the molecule 630 comprises two portions 632 and 634. The molecule 630 evidences a larger band gap state, with less π-delocalization. Application of an electric field causes charge separation in the molecule 630, resulting in a smaller band gap state, with better π-delocalization. Recombination of the charges returns the molecule 630 to its original state.

The following requirements must be met in this model:

(a) The molecule must have a modest dielectric constant $\epsilon_r$ and can be easily polarized by an external E-field, with $\epsilon_r$ in the range of 2 to 10 and polarization fields ranging from 0.01 to 10 V/nm;

(b) At least one segment of the molecule must have non-bonding electrons, or π-electrons, or π-electrons and non-bonding electrons that can be mobilized over the entire molecule or a part of the molecule;

(c) The molecule can be symmetrical or asymmetrical;

(d) The inducible dipole(s) of the molecule can be oriented in at least one direction;

(e) The charges will be separated either partially or completely during E-field induced polarization;

(f) The states of charge separation or recombination can be E-field dependent or bi-stable, stabilized through inter- or intra-molecular forces such as covalent bond formation, hydrogen bonding, charge attraction, Coulomb forces, metal complex, or Lewis acid (base) complex, etc.;

(g) The process of charge separation or recombination of the molecule can involve or not involve σ- and π-bond breakage or formation; and (h) During the charge separation or re-combination process activated by an E-field, the band gap of the molecule will change depending on the degree of the non-bonding election, or π-electron, or π-electron and non-bonding electron delocalization in the molecule. Both optical and electrical properties of the molecules will be changed accordingly.

One example of an E-field induced band gap change (color change) via charge separation or recombination involving bond breaking or bond formation is shown below (Example 3):

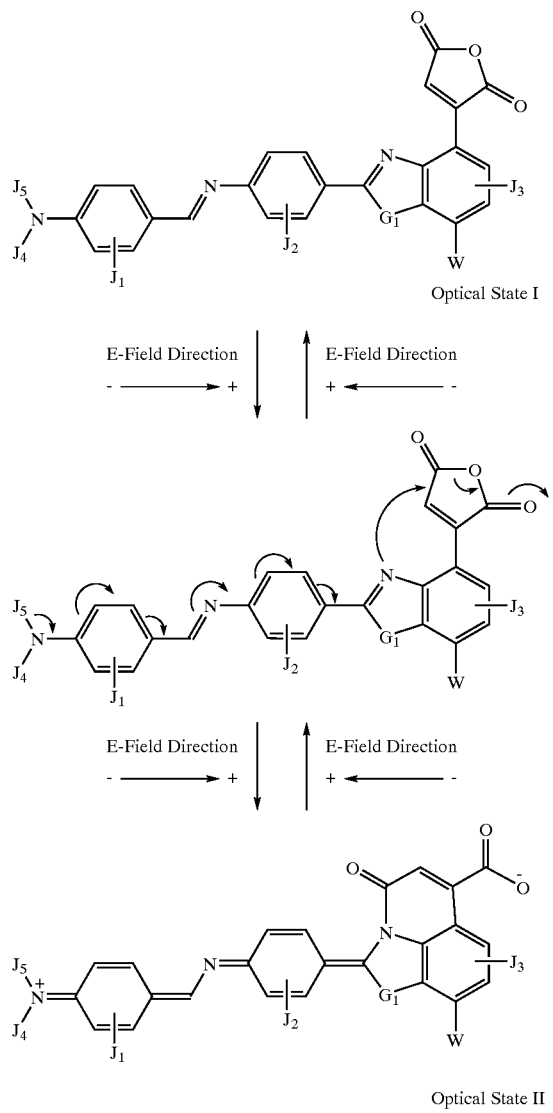

where:

The letters $J_1$, $J_2$, $J_3$, $J_4$ and $J_5$ represent tuning groups built into the molecule. The function of these tuning groups (e.g.; OH, NHR, COOH, CN, nitro, etc.) is to provide an appropriate functional effect (e.g., both inductive effect and resonance effects) and/or steric effects. The functional effect is to tune the band gap ($\Delta E_{HOMO/LUMO}$) of the molecule to get the desired electronic as well as optical properties of the molecule. The steric effect is to tune the molecule conformation through steric hindrance, inter- or intra-molecular interaction forces (e.g., hydrogen bonding, Coulomb interaction, van der Waals forces) to provide bi- or multiple-stability of molecular orientation. They may be any one of the following: hydrogen, hetero atom (e.g., N, O, S, P, B, F, Cl, Br and I), functional group with at least one of above-mentioned hetero atoms, hydrocarbon (either saturated or unsaturated) or substituted hydrocarbon.

The letter $G_1$ is a bridging group. The function of the bridging group is to connect two or more conjugated rings to achieve a desired chromophore. The bridging group may be any one of the following: hetero atoms (e.g., N, O, S, P, etc.) or functional group with at least one of above-mentioned hetero atoms (e.g., NH, etc.), hydrocarbon or substituted hydrocarbon.

The letter W is an electron-withdrawing group. The function of this group is to tune the reactivity of the maleic anhydride group of this molecule, which enables the molecule to undergo a smooth charge separation or recombination (bond breaking or formation, etc.) under the influence of an applied external E-field. The electron-withdrawing group may be any one of the following: carboxylic acid or its derivatives (e.g., ester or amide etc.), nitro, nitrile, ketone, aldehyde, sulfone, sulfuric acid or its derivatives, hetero atoms (e.g., F, Cl, etc.) or functional group with at least one of the hetero atoms (e.g., F, Cl, Br, N, O, S, etc.).

An example of an E-field induced band gap change involving the formation of a molecule-metal complex or a molecule-Lewis acid complex is shown below (Example 4):

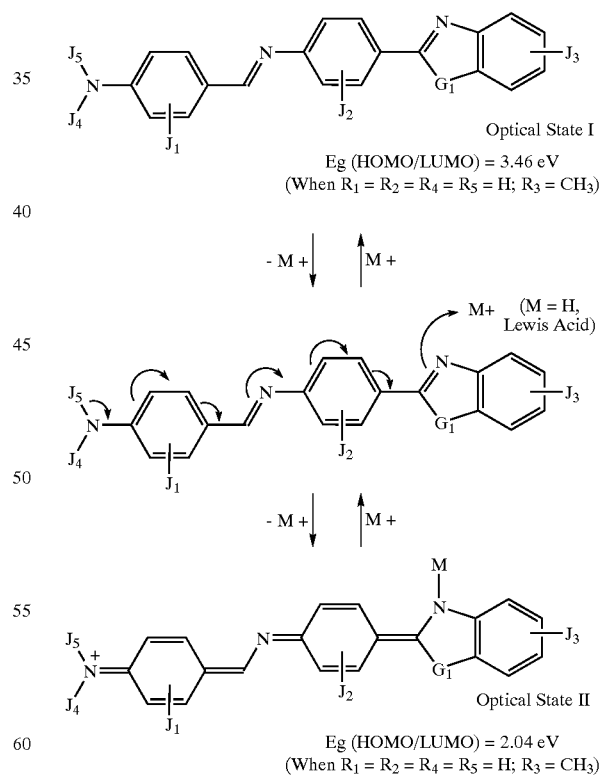

where:

The fetters $J_1$, $J_2$, $J_3$, $J_4$ and $J_5$ represent tuning groups built into the molecule. The function of these tuning groups (e.g., OH, NHR, COOH, CN, nitro, etc.) is to provide anappropriate functional effect (e.g. both inductive and resonance effects) and/or steric effects. The functional effect is to tune the band gap ($\Delta E_{HOMO/LUMO}$) of the molecule to get the desired electronic as well as optical properties of the molecule. The stoic effect is to tune the molecular conformation through steric hindrance, inter- or intra-molecular interaction forces (e.g., hydrogen bonding, Coulomb interaction, van der Waals forces) to provide bi- or multiple-stability of the molecular orientation. They may be any one of the following: hydrogen, hetero atom (e.g., N, O, S, P, B, F, Cl, Br, and I), functional group with at least one of the above-mentioned hetero atoms, hydrocarbon (either saturated or unsaturated) or substituted hydrocarbon.

The letter $G_1$ is a bridging group. The function of the bridging group is to connect two or more conjugated rings to achieve a desired chromophore. The bridging group may be any one of the following: hetero atoms (e.g., N, O, S, P, etc.) or functional group with at least one of above-mentioned hetero atoms (e.g., NH, etc.) or substituted hydrocarbon.

$M^+$ represents metals, including transition metals, or their halogen complexes or $H^+$ or other type of Lewis acid(s).

Model (2b): E-Field Induced Band Gap Change Caused by the Change of Extended Conjugation via Charge Separation or Recombination and π-Bond Breaking or Formation:

FIG. 6b is a schematic depiction of this model, which involves an E-field-induced band gap change caused by the change of extended conjugation via charge separation or recombination and π-bond breaking or formation. As shown in FIG. 6b, the molecule 630' comprises two portions 632' and 634'. The molecule 630' evidences a smaller band gap state. Application of an electric field causes breaking of the π-bond in the molecule 630', resulting in a larger band gap state. Reversal of the E-field re-connects the π-bond between the two portions 632' and 634' and returns the molecule 630' to its original state.

The requirements that must be met in this model are the same as listed for Model 2(a).

One example of an E-field induced band gap change cause by extended conjugation via charge separation (σ-bond breaking and π-bond formation) is shown below (Example 5):

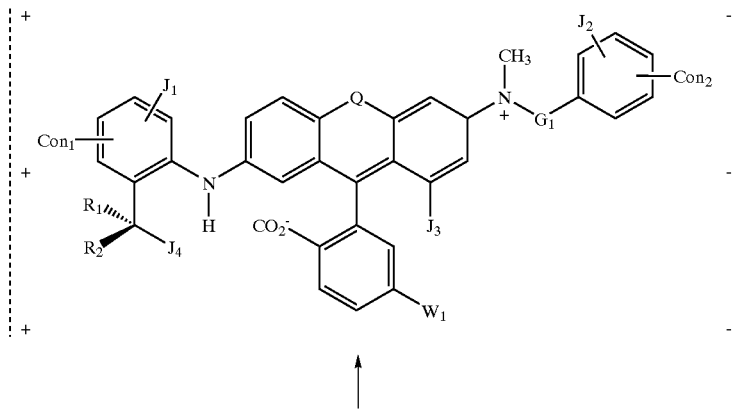

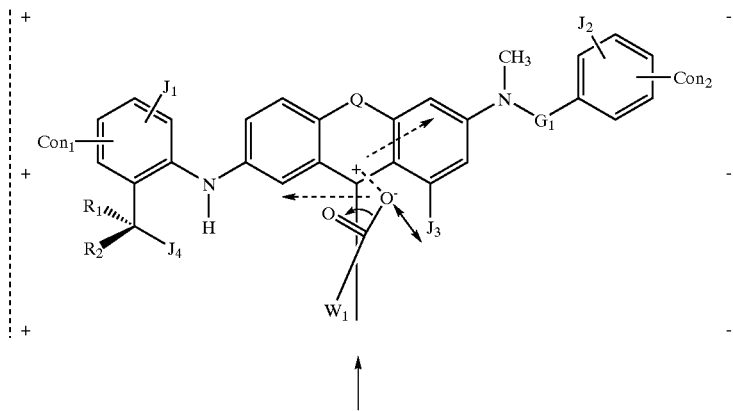

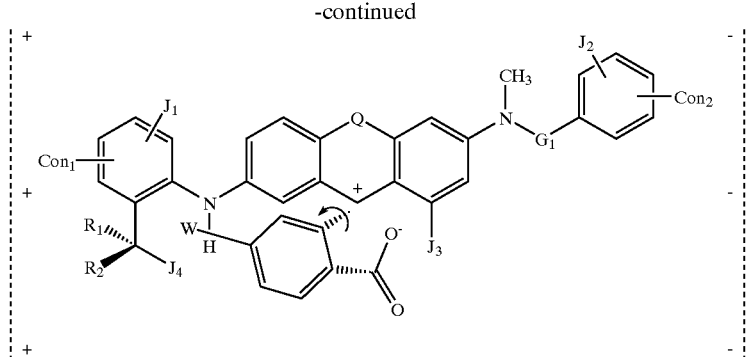

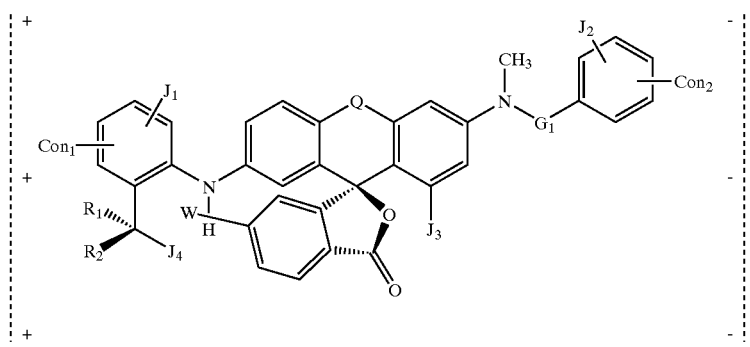

where:

The letter Q is used here to designate a connecting unit between two phenyl rings It can be any one of following: S, O, NH, NR, hydrocarbon, or substituted hydrocarbon.

The letters $Con_1$ and $Con_2$ are connecting groups between one molecule and another molecule or between a molecule and a solid substrate (e.g., metal electrode, inorganic or organic substrate, etc.). They may be any one of the following: hydrogen (through a hydrogen bond), hetero atoms (i.e., N, O, S, P, etc.) or functional groups with at least one of above-mentioned hetero atoms (e.g., NH, etc.), hydrocarbons (either saturated or unsaturated) or substituted hydrocarbons.

The letters $R_1$ and $R_2$ represent spacing groups built into the molecule. The function of these spacer units is to provide an appropriate 3-dimensional scaffolding to allow the molecules to pack together while providing rotational space for each rotor. They may be any one of the following: hydrogen, hydrocarbons (either saturated or unsaturated) or substituted hydrocarbons.

The letters $J_1$, $J_2$, $J_3$ and $J_4$ represent tuning groups built into the molecule. The function of these tuning groups (e.g., OH, NHR, COOH, CN, nitro, etc.) is to provide an appropriate functional effect (e.g. both inductive and resonance effects) and/or steric effects. The functional effect is to tune the band gap ($\Delta E_{HOMO/LUMO}$) of the molecule to get the desired electronic as well as optical properties of the molecule. The steric effect is to tune the molecular conformation through steric hindrance, inter- or inter-molecular interaction forces (e.g., hydrogen bonding, Coulomb interaction, van der Waals forces) to provide bi- or multiple-stability of molecular orientation. They may also be used as spacing group to provide an appropriate 3-dimensional scaffolding to allow the molecules to pack together while providing rotational space for each rotor. They may be any one of the following, hydrogen, hetero atom (e.g., N, O, S, P, B, F, Cl, Br, and I), functional group with at least one of above-mentioned hetero atom, hydrocarbon (either saturated or unsaturated) or substituted hydrocarbon.

The letter $G_1$ is a bridging group. The function of the bridging group is to connect the stater and rotor or to connect two or more conjugated rings to achieve a desired chromophore. The bridging group may be any one of the following: hetero atoms (e.g., N, O, S, P, etc.) or functional groups with at least one of above-mentioned hetero atoms (e.g., NH or NHNH, etc.), hydrocarbon (either saturated or unsaturated) or substituted hydrocarbon.

The letter W is an electron-withdrawing group. The function of this group is to time the reactivity of the lactone group of this molecule, which enables the molecule to undergo a smooth charge separation or recombination (bond breaking or formation, etc.) under the influence of an applied external E-field. The electron-withdrawing group may be any one of the following: carboxylic acid or its derivatives (e.g., ester or amide etc.), nitro, nitrite, ketone, aldehyde, sulfone, sulfuric acid or its derivatives, hetero atoms (e.g., F, Cl, etc.) or functional group with at least one of hetero atoms (e.g., F, Cl, Br, N, O and S, etc.), hydrocarbon (either saturated or unsaturated) or substituted hydrocarbon.

The uppermost molecular structure has a smaller hand gap state than the lowermost molecular structure.

Another example of an E-field induced band gap change caused by breakage of extended π-bond conjugation via charge recombination and σ-bond formation is shown below (Example 6):

Example 6
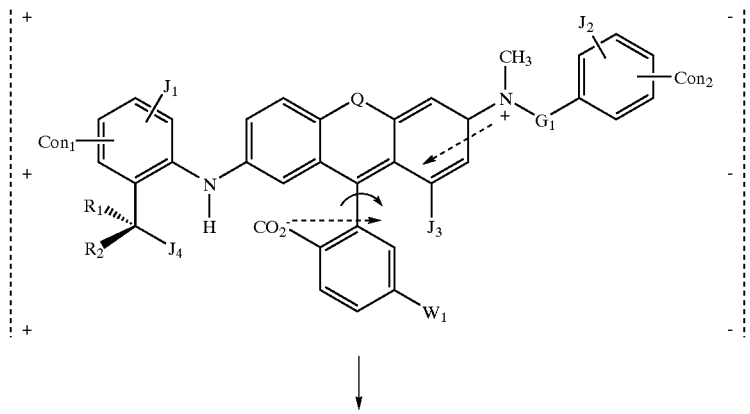
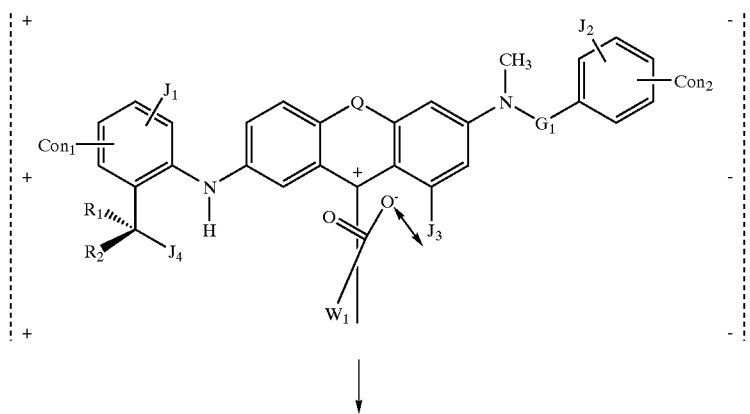
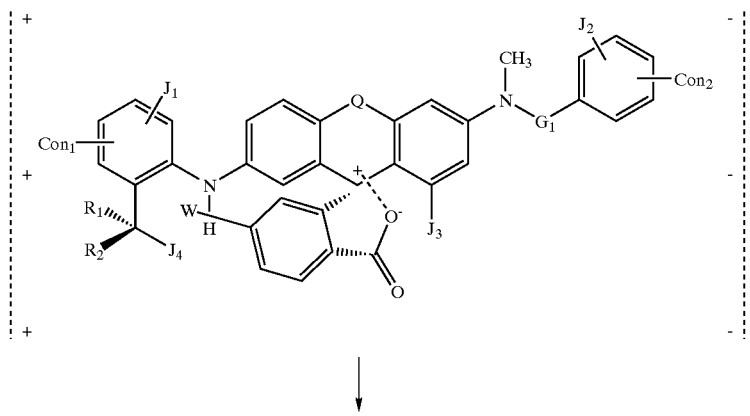

-continued

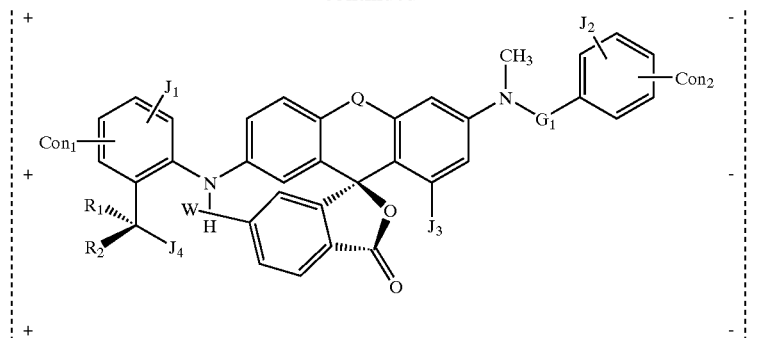

where:

The letter Q is used here to designate a connecting unit between two phenyl rings. It can be any one of following: S, O, NH, NR, hydrocarbon, or substituted hydrocarbon.

The letters $Con_1$ and $Con_2$ are connecting groups between one molecule and another molecule or between a molecule, and a solid substrate (e.g., metal electrode, inorganic or organic substrate, etc.). They may be any one of the following: hydrogen, hetero atoms (i.e., N, O, S, P, etc.) or functional group with at least one of above-mentioned hetero atoms (e.g., NH, etc.), hydrocarbon (either saturated or unsaturated) or substituted hydrocarbon.

The letters $R_1$ and $R_2$ represent spacing groups built into the molecule. The function of these spacer units is to provide an appropriate 3-dimensional scaffolding to allow the molecules to pack together while providing rotational space for each rotor. They may be any one of the following: hydrogen, hydrocarbon (either saturated or unsaturated) or substituted hydrocarbon.

The letters $J_1$, $J_2$, $J_3$ and $J_4$ represent tuning groups built into the molecule. The function of these tuning groups (e.g., OH, NHR, COOH, CN, nitro, etc.) is to provide an appropriate functional effect (e.g., both inductive and resonance effect) and/or steric effects. The functional effect is to tune the band gap ($\Delta E_{HOMO/LUMO}$) of the molecule to get the desired electronic as well as optical properties of the molecule. The steric effect is to tune the molecule conformation through steric hindrance, inter- or intra-molecular interaction forces (e.g. hydrogen bonding, Coulomb interaction, van der Waals forces) to provide bi- or multiple-stability of molecular orientation. They may also be used as spacing groups to provide an appropriate 3-dimensional scaffolding to allow the molecules to pack together while providing rotational space for each rotor. They may be any one of the following: hydrogen, hetero atom (e.g., N, O, S, P, B, F, Cl, Br, and I), functional groups with at least one of above-mentioned hetero atom, hydrocarbon (either saturated or unsaturated) or substituted hydrocarbon.

The letter $G_1$ is a bridging group. The function of this bridging group is to connect stator and rotor or to connect two or more conjugated rings to achieve a desired chromophore. The bridging group may be any one of the following: hereto atoms (e.g., N, O, S, P, etc.) or functional group with at least one of above-mentioned hetero atoms (e.g., NH or NHNH, etc.), hydrocarbon (either saturated or unsaturated) or substituted hydrocarbon.

The letter W is an electron-withdrawing group. The function of this group is to tune the reactivity of the lactone group of this molecule, which enables the molecule to undergo a smooth charge separation or recombination (bond breaking or formation, etc.) under the influence of an applied external E-field. The electron-withdrawing group may be any one of the following: carboxylic acid or its derivatives (e.g., ester or amide, etc.), nitro, nitrite, ketone, aldehyde, sulfone, sulfuric acid or its derivatives, hetero atoms (e.g., F, Cl etc.) or functional group with at least one of hetero atoms (e.g., F, Cl, Br, N, O, S, etc.), hydrocarbon (either saturated or unsaturated) or substituted hydrocarbon.

Again, the uppermost molecular structure has a smaller band gap state than the lowermost molecular structure.

The present invention turns ink or dye molecules into active devices that can be switched with an external electric field by a mechanism completely different from any previously described electro-chromic or chromogenic material. The general idea is to use modified Crystal Violet lactone type of molecules in with the C—O bond of the lactone is sufficiently labile enough and can undergo a bond breaking and forming (see Examples 5 and 6 above) under the influence of an applied electric field.

A positive and a negative charge are generated during the C—O bond breaking process. The resulting charges will be separated and move in opposite directions parallel to the applied external field (upper part of the molecule), or bond rotation (lower part of the molecule. The two aromatic rings with an extended dipole (upper part and lower part) of the molecule is completely conjugated, and a color (red-shift) results (see Example 5). However, the molecule is designed to have inter- and/or intra-molecular forces, such as hydrogen bonding, Coulomb, or dipole-dipole interactions as well as steric repulsions, or by a permanent external E-field to stabilize both charges in this particular orientation. Thus, a large field is required to unlatch the molecule from its initial orientation. Once switched into a particular orientation, the molecule will remain in that orientation until it is switched out.

When a reverse E-field is applied (Example 6), both charges tend to realign themselves to the direction of the reverse external field. The positive charge on the upper part of the molecule will migrate to the center part of the molecule (tri-aryl methane position) from the side of the molecule through the non-bonding electron, or π-electron, or π-electron and non-bonding electron delocalization. Likewise, the negative charged lower part of the molecule will tend to move closer to the external E-field through C—C bond rotation. A key component of the molecule design is that there is a steric and static repulsion between the $CO_2^-$ and the $J_3$ and $J_4$ groups that will prevent the lower part of the molecule (the negative charged sector) from rotating through a complete 180 degree half cycle. Instead, the rotation is halted by the steric interaction of bulky groups on the lower pert and the upper part at an angle of approximately 90 degrees from the initial orientation. Furthermore, this 90 degree orientation is stabilized by a C—O bond formation and charge recombination. During this process, a tetrahedral carbon (an isolator) is formed at the tri-aryl methane position. The conjugation of the molecule is broken and the HOMO and LUMO are no longer delocalized over the entire upper part of the molecule. This has the effect of shrinking the size of the volume occupied by the electrons, which causes the HOMO-LUMO gap to increase. A blue-shifted color or transparent state will result during this process.

For colored ink and dye molecules, the limitation of the positive charge migration just between one side of a molecule and the center position is crucial. Another important factor is the ability to switch the rotor (lower part of molecule) between two states separated by an optically significant angle (nominally 10 to 170 degrees) from the stators (the upper part of the molecule). When the intra-molecular charge separation reaches a maximum distance, then the upper most part of the molecule becomes completely conjugated. Thus, the π-electrons or π-electrons and non-bonding electrons of the molecule, through its highest occupied molecular orbital (HOMO) and lowest unoccupied molecular orbital (LUMO), are delocalized over the upper most region. The effect is identical to that for a quantum mechanical particle in a box: when the box is the size of the entire molecule, i.e., when the orbitals are delocalized, then the gap between the HOMO and LUMO is relatively small. In this case the HOMO-LUMO gap of the molecule is designed to yield the desired color of the ink or dye. The HOMO-LUMO gap for the all-parallel structure can be tuned by substituting various chemical groups ($J_1$, $J_2$, $J_3$, $J_4$, and W) onto the different aromatic rings of the molecule. In the case where the rotor (lower part of the molecule) is rotated by 10 to 170 degrees with respect to the stators (the upper part of the molecule), depending on the nature of the chemical substituents ($J_1$, $J_2$, $J_3$, $J_4$, and W) banded to the rotor and stator, then the increased HOMO-LUMO gap will correspond to a color that is blue-shifted with respect to the color of the all-parallel structure. With sufficient shifting, the molecule becomes transparent, if the new HOMO-LUMO gap is large enough. Thus, the molecule is switchable between two colors or from one color to a transparent state.

Examples 5 and 6 show two different states of a representative switchable molecule under the influence of an externally applied E-field. For this particular type of molecule, a sufficiently thick molecular film is grown, for example using Lang-muir-Blodgett techniques, vapor phase deposition, or electrochemical deposition, such that the orientation axis of the molecules is perpendicular to the plane of the electrodes used to switch the molecules. Another deposition technique is to suspend the molecule as a monomer/oligomer or solvent-based solution that is thick film coated (e.g., reverse roll) or spin-coated onto the substrate and subsequently polymerized (e.g., by UV radiation) or dried while the coating is subjected to an electric field that orients the molecule. A top electrode may be a transparent conductor, such as indium-tin oxide, and the films are grown such that the molecular axis is parallel to the plane of the electrodes. The molecules form solid-state or liquid crystals in which the large stator groups are locked into position by intermolecular interactions or direct bonding to a support structure, but the rotor is small enough to move within the lattice of the molecules.

Model (3): E-Field Induced Band Gap Change via Molecular Folding or Stretching

Figure 7:
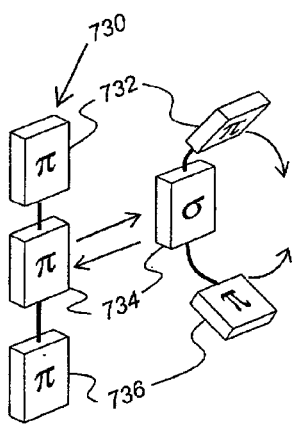

FIG. 7 is a schematic depiction of this model, which involves an E-field-induced band gap change caused by the change of extended conjugation via molecular folding or stretching. As shown in FIG. 7, the molecule 730 comprises three portions 732, 734, and 736. The molecule 730 evidences a smaller band gap state due to an extended conjugation through a large region of the molecule. Application of an electric field causes breaking of the conjugation in the molecule 730, due to molecular folding about the central portion 734, resulting in a larger band gap state due to the non-extended conjugation in the large region of the molecule. Reversal of the E-field unfolds the molecule 730 and returns the molecule to its original state. Stretching and relaxing of the central portion 734 of the molecule 730 has the same effect.

The following requirements must be met in this Model:

(a) The molecule must have at least two segments;

(b) Several segments (portions) should have non-bonding electrons, or π-electrons, or π-electrons and non-bonding electrons involved in the HOMOs, LUMOs, and nearby orbitals;

(c) The molecule may be either symmetrical or asymmetrical with a donor group on one side and an acceptor group on another side;

(d) At least two segments of the molecule have some functional groups that will help to stabilize both states of folding and stretching through intra- or inter-molecular forces such as hydrogen bonding, van der Waals forces, Coulomb attraction or metal complex formation;

(e) The folding or stretching states of the molecule must be E-field addressable;

(f) In at least one state (presumably in a fully stretched state), the non-bonding electrons, or π-electrons, or π-electrons and non-bonding electrons of the molecule will be well-delocalized, and the π- and p-electrons electrons of the molecule will be localized or only partially delocalized in other state(s);

(g) The band gap of the molecules will change depending on the degree of non-bonding electron, or π-electron, or π-electron and non-bonding electron delocalization while the molecule is folded or stretched by as applied external E-field, and this type of change will also affect the electrical or optical properties of the molecule as well; and (h) This characteristic can be applied to these types of molecules for optical or electrical switches, gates, storage or display applications.

An example of an E-field induced band gap change via molecular folding or stretching is shown below (Example 7):

Example 7

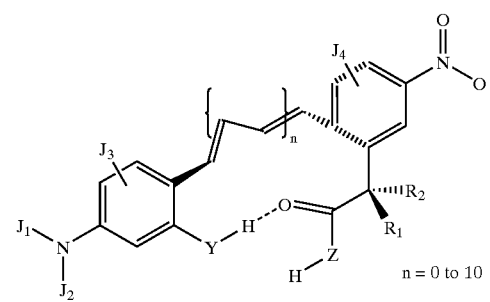

n = 0 to 10

Molecule Folding ⇌ Stretching Out

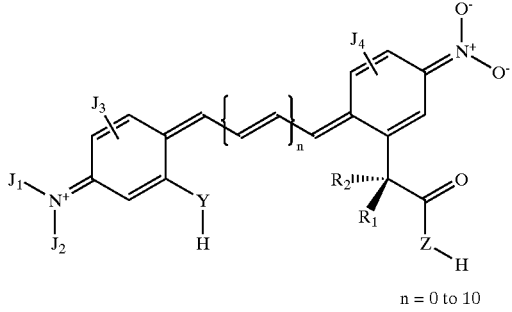

n = 0 to 10 where:

The letters $R_1$ and $R_2$ represent spacing groups built into the molecule. They may be any one of the following: hydrogen, hydrocarbon (either saturated or unsaturated) or substituted hydrocarbon.

The letters $J_1$, $J_2$, $J_3$, $J_4$ and $J_5$ represent tuning groups built into the molecule. The function of these tuning groups (e.g., OH, NHR, COOH, CN, nitro, etc.) is used to provide an appropriate functional effect (e.g., both inductive and resonance effects) and/or steric effects. The functional effect is to tune the band gap ($\Delta E_{HOMO/LUMO}$) of the molecule to get the desired electronic as well as optical properties of the molecule. The steric effect is to tune the molecular conformation through steric hindrance, inter- or intra-molecular interaction forces (e.g. hydrogen hooding, Coulomb interaction, van der Walls forces) to provide bi- or multiple-stability of molecular orientation. They may also be used as spacing group They may be any one of the following: hydrogen, hetero atom (e.g., N, O, S, P, B, F, Cl, Br and I), functional group with at least one of above-mentioned hetero atom, hydrocarbon (either saturated or unsaturated) or substituted hydrocarbon.

Letters Y and Z are functional groups that will form inter- or intra-molecular hydrogen bonding. They may be any one of following; SH, OH, amine, hydrocarbon, or substituted hydrocarbon.

The molecule on the top of the graphic has a larger band gap due to the localized conjugation various parts of the molecule, while the molecule on the bottom has a smaller band gap due to an extended conjugation through a large region of the molecule.

What is claimed is:

1. An electronic book device comprising:
   a rewritable viewing screen; and
   an electrical printhead for writing picture elements of said viewing screen, wherein said viewing screen has a rewritable molecular colorant for printing document content therewith.

2. The device as set forth in claim 1, said colorant comprising:
   bistable, bi-modal molecular colorant susceptible to electrical fields from said printhead for forming said picture elements.

3. The device as set forth in claim 1 further comprising:
   electronics for downloading, storing, sequencing, and erasably printing on the screen.

4. The device as set forth in claim 1 further comprising:
   a housing, and
   said screen is biasingly extendable and retractable with respect to the housing such that said screen passes across said printhead wherein one pass writes an entire screen page.

5. The device as set forth in claim 4 further comprising:
   said printhead includes a plurality of addressable electrodes such that screen pixel resolution is determined by electrode packing density.

6. The device as set forth in claim 1 further comprising:
   said device is portable, having a self-contained power supply, memory, and electronic controls interconnected for processing data representative of alphanumeric characters and graphics for printing said data on said screen.

7. The device as set forth in claim 4 further comprising:
   a biased roller, wherein said screen is a flexible sheet having one extremity affixed to a roller and an opposing extremity for selectively extending from and retracting into said housing.

8. The device as set forth in claim 7 comprising:
   said housing has physical dimensions to accommodate said biased roller with said sheet wrapped thereabout and said printhead such that portability is maximized.

9. The device as set forth in claim 1 comprising:
   a control pad providing interactive function controls for processing data displayed on said screen.

10. The device as set forth in claim 1 further comprising:
    a wired or wireless input port for receiving at least one readable document electronically.

11. The device as set forth in claim 1 further comprising:
    said viewing screen and printhead are operationally associated for printing a full page document content in a single pass of said screen across said printhead.

12. The device as set forth in claim 1 wherein document content resolution of a page printed on said screen is at least equal to commercial hard copy print resolution.

13. The device as set forth in claim 2, said colorant further comprising:
    molecules that exhibit an electric field induced band gap change.

14. The device as set forth in claim 13 comprising:
    said electric field induced band gap change occurs via a mechanism selected from a group including (1) molecular conformation change or an isomerization, (2) change of extended conjugation via chemical bonding change to change the band gap, and (3) molecular folding or stretching.

15. The device as set forth in claim 13 comprising:
    said molecules have more than two said states, switchable such that optical properties can be tuned either continuously by application of a decreasing or increasing electric field to form a volatile switch or color of selected composition regions is changed abruptly by application of voltage pulses to switch with at least one molecular activation barrier.

16. A rewritable digital book device comprising:
    a housing means for housing components of said device;
    means for downloading, storing, sequencing, and erasably printing document content; and
    viewing means, including a molecular colorant, for erasably writing said content.

17. The device as set forth in claim 16 comprising:
    said colorant including a bistable, bi-modal molecular colorant system susceptible to electrical fields from said printhead for forming picture elements of said viewing means.

18. The device as set forth in claim 17 wherein said viewing means comprises:
    a plurality of viewing screens wherein each screen has said system for displaying successive pages of said document content.

19. The device as set forth in claim 17 wherein said viewing means comprises:
    a single viewing screen having said system such that one or more successive pages of said document is displayed thereon.

20. The device as set forth in claim 16 comprising:
    said viewing means is extractable from said housing means such that said content is erased and written simultaneously in full page content via extraction and retraction.

21. The device as set forth in claim 16 comprising:
    said means for downloading, storing, sequencing, and erasably printing document content including means for internet data and controls processing.

22. The device as set forth in claim 16 comprising:
    said means for downloading, storing, sequencing, and erasably printing document content including wireless communication means for retrieving said content.

23. The device as set forth in claim 16 incorporated into a personal digital assistant apparatus.

24. The device as set forth in claim 23 comprising:
    said viewing means is detachable from said device.

25. The device as set forth in claim 16 comprising:
    said means for downloading, storing, sequencing, and erasably printing document content including an addressable molecular wire mechanism.

26. The device as set forth in claim 16 further comprising:
    a screen having displayed thereon controls for manipulating said downloading, storing, sequencing, and erasably printing document content.

27. The device as set forth in claim 16 comprising:
    said housing means is in a geometric form and size associated with hard copy newsprint.

28. The device as set forth in claim 16 comprising:
    said housing means is in a geometric form and size of associated with pocket-sized commercial products.

29. The device as set forth in claim 16 further comprising:
    associated with said means for downloading, storing, sequencing, and erasably printing document content, means for viewing means position sensing.

30. The device as set forth in claim 16 further comprising:

associated with said means for downloading, storing, sequencing, and erasably printing document content and said viewing means, means for controlling content printing on said viewing means.

31. A method of providing readable pages, the method comprising:

downloading data representative of each of said readable pages into a memory;

providing a viewing screen having an electric field addressable rewritable molecular colorant thereon; and writing each of said pages to the viewing screen by passing the screen adjacently across a printhead having electrical fields associated with pixels of the screen such that said data is transferred from said memory to said screen.

32. The method as set forth in claim 31, further comprising:

providing a communications interface capability for obtaining an electronic copy of a written document anytime and anyplace and in any known manner where a communications link can be established.

33. The method as set forth in claim 31 comprising:

using a bi-modal, bistable, molecular system for creating alphanumeric characters and graphic images on said screen.

34. The method as set froth in claim 33 wherein said system has molecules that exhibit an electric field induced band gap change.

35. The method as set forth in claim 33 wherein said electric field induced band gap change occurs via a mechanism selected from a group including (1) molecular conformation change or an isomerization, (2) change of extended conjugation via chemical bonding change to change the band gap, and (3) molecular folding or stretching.

36. A method of doing business of distribution of a document, the method comprising:

transmitting electronic data representative of said document; and providing a customer with mechanisms associated with said transmitting for said customer to receive said data on a portable reading device having a single display screen including an electric field addressable rewritable molecular colorant.

37. The method as set forth in claim 36, further comprising:

using commercially-available communications interfacing for said transmitting such that an electronic copy of a written document anytime and anyplace and in any known manner where a communications link can be established.

38. The method as set forth in claim 36 comprising:

using a bi-modal, bistable, molecular system for creating alphanumeric characters and graphic images on said screen.

39. The method as set froth in claim 38 wherein said system has molecules that exhibit an electric field induced band gap change.

40. The method as set forth in claim 39 wherein said electric field induced band gap change occurs via a mechanism selected from a group including (1) molecular conformation change or an isomerization, (2) change of extended conjugation via chemical bonding change to change the band gap, and (3) molecular folding or stretching.

41. The method as set forth in claim 36 comprising:

providing said document in real-time on a page-by-page paid basis.

42. The method as set forth in claim 36 comprising:

providing said document in real-time on a document-by-document paid basis.

43. The method as set forth in claim 36 said mechanisms further comprising:

providing controls associated with ordering documents from an index of available documents.

44. The method as set forth in claim 36 said mechanisms further comprising:

providing security controls associated with purchase of said document.

45. A method of manufacture of an electronic book apparatus, the method comprising:

assembling a portable housing with subsystems for receiving data and generating readable images of said data; and combining said subsystems with a display for said readable images wherein said display includes an electric field addressable rewritable molecular colorant.

46. The method as set forth in claim 45 comprising:

fabricating said display including a view screen surface using a bi-modal, bistable, molecular system for creating alphanumeric characters and graphic images on said surface.

47. The method as set forth in claim 46 wherein said molecules exhibit an electric field induced band gap change.

48. The method as set forth in claim 47 wherein said electric field induced band gap change occurs via a mechanism selected from a group including (1) molecular conformation change or an isomerization, (2) change of extended conjugation via chemical bonding change to change the band gap, and (3) molecular folding or stretching.

* * * * *